United States Patent
Lacroix et al.

(10) Patent No.: US 9,988,518 B2
(45) Date of Patent: *Jun. 5, 2018

(54) CHLORINE-RESISTANT CROSSLINKABLE POLYOLEFIN COMPOSITIONS AND ARTICLES MADE THEREFROM

(71) Applicant: Momentive Performance Materials Inc., Waterford, NY (US)

(72) Inventors: Christine Lacroix, Ornex (FR); Philbert E. Ramdatt, New York, NY (US); Eric Pohl, Mount Kisco, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/597,760

(22) Filed: Jan. 15, 2015

(65) Prior Publication Data

US 2015/0132518 A1 May 14, 2015

Related U.S. Application Data

(63) Continuation of application No. 13/093,329, filed on Apr. 25, 2011, now Pat. No. 8,962,718.

(60) Provisional application No. 61/327,913, filed on Apr. 26, 2010.

(51) Int. Cl.
| | |
|---|---|
| *C08F 255/02* | (2006.01) |
| *C08F 230/08* | (2006.01) |
| *C08L 23/06* | (2006.01) |
| *C08L 23/08* | (2006.01) |
| *C08L 51/06* | (2006.01) |
| *C08K 5/3435* | (2006.01) |
| *C08K 5/00* | (2006.01) |
| *C08K 5/13* | (2006.01) |
| *C08K 5/34* | (2006.01) |
| *C08K 5/49* | (2006.01) |
| *C08J 3/22* | (2006.01) |

(52) U.S. Cl.
CPC ............ *C08K 5/005* (2013.01); *C08F 230/08* (2013.01); *C08F 255/02* (2013.01); *C08J 3/22* (2013.01); *C08K 5/3435* (2013.01); *C08L 23/06* (2013.01); *C08L 23/0815* (2013.01); *C08L 51/06* (2013.01); *C08J 2351/06* (2013.01); *C08K 5/13* (2013.01); *C08K 5/34* (2013.01); *C08K 5/49* (2013.01); *C08L 2203/18* (2013.01); *C08L 2205/025* (2013.01); *C08L 2205/03* (2013.01); *C08L 2310/00* (2013.01); *C08L 2312/08* (2013.01); *Y10T 428/139* (2015.01)

(58) Field of Classification Search
CPC ...... C08F 255/02; C08F 230/08; C08L 23/06; C08L 23/0815; C08L 51/06; C08L 2203/18; C08L 2310/00; C08L 2312/08; C08L 2205/025; C08L 2205/03; C08K 5/3435; C08K 5/005; C08K 5/13; C08K 5/34; C08K 5/49; C08J 3/22; C08J 2351/06
USPC .......................................................... 524/99
See application file for complete search history.

(56) References Cited

U.S. PATENT DOCUMENTS

| | | | |
|---|---|---|---|
| 4,546,154 A | 10/1985 | Robertson | |
| 4,970,559 A | 11/1990 | Miyabayashi | |
| 6,232,376 B1 | 5/2001 | Tsukada et al. | |
| 8,962,718 B2 * | 2/2015 | Lacroix et al. | 524/99 |
| 2003/0073771 A1 | 4/2003 | Sanders et al. | |
| 2006/0135709 A1 | 6/2006 | Hasegawa et al. | |
| 2007/0184227 A1 | 8/2007 | Steffl et al. | |

FOREIGN PATENT DOCUMENTS

| | | |
|---|---|---|
| EP | 1253169 | 3/2006 |
| EP | 1637565 | 3/2006 |
| EP | 1925628 | 5/2008 |
| GB | 1286460 | 8/1972 |
| GB | 1526398 | 9/1978 |
| WO | 9724023 | 7/1997 |
| WO | 2008148660 | 12/2008 |

OTHER PUBLICATIONS

International Search Report dated Sep. 29, 2011.
International Preliminary Report on Patentability dated Oct. 30, 2012.

* cited by examiner

*Primary Examiner* — Angela C Scott
(74) *Attorney, Agent, or Firm* — James C. Abruzzo

(57) ABSTRACT

The present invention relates to chlorine resistant crosslinkable silane-containing polyolefin compositions and stabilizer masterbatch compositions, their preparation, and articles made therefrom. These crosslinkable silane-containing compositions contain a mixture of antioxidants, light absorbers and stabilizers that provide resistance to the levels of chlorine used in potable water and to light, thereby extending the useful life of said articles made therefrom, such as potable water pipes and valves, bottles, tanks, and the like.

20 Claims, No Drawings

CHLORINE-RESISTANT CROSSLINKABLE POLYOLEFIN COMPOSITIONS AND ARTICLES MADE THEREFROM

CROSS-REFERENCE TO RELATED APPLICATIONS

The present application is a continuation of U.S. patent application Ser. No. 13/093,329 filed on Apr. 25, 2011, to which priority is claimed from U.S. provisional Application No. 61/327,913 filed Apr. 26, 2010, both of which are incorporated herein by reference in their entireties.

FIELD OF THE INVENTION

The present invention relates to chlorine-resistant crosslinkable silane-containing polyolefin compositions and stabilizer masterbatch compositions, their preparation, and articles made therefrom, such as potable water pipes and valves, bottles, tanks, and the like.

BACKGROUND OF THE INVENTION

Description of the Related Art

Crosslinkable silane-containing polyolefins containing antioxidants are used to make articles that come in contact with water. The hydrolysable silyl group is incorporated into the polyolefin structure either by copolymerizing an alkoxysilane containing a reactive carbon-carbon double bond with the alkene monomer or by grafting an organofunctional alkoxysilane onto a polyolefin resin. The crosslinkable silane-containing compositions are cured upon exposure to liquid water or atmospheric moisture in the presence of a curing catalyst.

Moisture curable polyolefin compositions can be prepared by a variety of processes. Silane-containing polyolefins have been prepared through a process in which alkoxysilane containing reactive carbon-carbon double bond are copolymerized with alkene monomers. These silane-containing polyolefin resins can be combined with the curing catalysts, antioxidants and other additives in a mixing process. Polyolefin resins can also be converted into a moisture curable polyolefin composition using a single step process, which typically involves introducing a polyolefin resin, unsaturated alkoxysilane, organic peroxide, curing catalyst, antioxidant, and other additives into a mixer, mixing the components together, heating the mixture until the alkoxysilane containing reactive carbon-carbon double bond is grafted onto the polyolefin resin, and extruding a molded part. In practice, the single step process can be converted into a multi-step process in which the grafting reaction is carried out in the absence of the curing catalysts and other additives. In a second-step, these catalysts and additives are mixed or blended with the crosslinkable silane-containing polyolefin. Curing of these crosslinkable silane-containing polyolefin compositions occurs when the compositions are contacted with water.

The crosslinkable silane-containing polyolefin compositions degrade when exposed to chlorine and other oxidants, such as ozone. Chlorine or other oxidants, such as ozone, are used in potable water to inhibit bacterial growth and prevent bacterial disease. The chlorine or other oxidants chemically reacts with the polyolefin polymers, causing the crosslinkable silane-containing polyolefin to become embrittled and cracked. The crosslinkable silane-containing polyolefin compositions and articles made therefrom can therefore fail when exposed to chlorine or other oxidants for long periods of time.

Therefore, a need exists for crosslinkable silane-containing polyolefin compositions that have resistance to degradation from chlorine or other oxidants and exposure to light, thereby providing for long-term use in the presence of light, or chlorine or other oxidants used in potable water applications, as well as improving heat endurance, thermal aging resistance, and resistance to yellowing.

SUMMARY OF THE INVENTION

The invention pertains to chlorine-resistant crosslinkable silane-containing polyolefin compositions and stabilizer masterbatch compositions, their preparation, and articles made therefrom. These crosslinkable silane-containing compositions contain a mixture of antioxidants, light absorbers and stabilizers that provide resistance to the levels of chlorine used in potable water and to light, thereby extending the useful life of said articles made therefrom, such as pipes and valves, bottles, tanks, and the like, as well as improving the heat endurance, thermal aging resistance and resistance to yellowing. These compositions are prepared by mixing with a hydrolysable silane-containing polyolefin or a polyolefin in the presence of a hydrolysable silane containing a carbon-carbon double bond and a peroxide, a stabilizer package, curing catalyst and optionally other additives. The stabilizer package can be efficiently added to the crosslinkable silane-containing polyolefin using a stabilizer masterbatch, in which the antioxidants, light absorbers, stabilizers and optionally other additives, have been previously mixed with or dispersed within a polyolefin carrier. The stabilizer masterbatch provides for a more uniform distribution of the antioxidants, light absorbers, stabilizers and other additives within the crosslinkable silane-containing polyolefin compositions, resulting in less degradation due to attack of the polymer by chlorine or other oxidants and light.

In an embodiment, the invention is directed to a crosslinkable silane-containing polyolefin composition comprising:
(a) a polyolefin containing at least one hydrolysable silyl group;
(b) a sterically hindered phenol antioxidant;
(c) a phosphite processing stabilizer;
(d) a sterically hindered amine light stabilizer;
(e) a substituted benzotriazol ultraviolet light absorber; and
(f) a curing catalyst.

In another embodiment of the invention, a stabilizer masterbatch comprises:
(a) a polyolefin;
(b) a sterically hindered phenol antioxidant;
(c) a phosphite processing stabilizer;
(d) a sterically hindered amine light stabilizer; and
(e) a substituted benzotriazol ultraviolet light absorber.

The stabilizer masterbatch can be used in the preparation of the crosslinkable silane-containing polyolefin composition. The stabilizer masterbatch can be added along with the curing catalyst to a polyolefin containing at least one hydrolysable silyl group and mixed under shearing conditions to disperse antioxidants, light absorbers, stabilizers and optionally other additives uniformly throughout the composition, or the stabilizer masterbatch along with the catalyst can be added to a polyolefin in the presence of a silane containing a reactive carbon-carbon double bond and a peroxide, under thermal mechanical conditions to effect the decomposition of the peroxide, thereby grafting the silane onto the polyolefin polymer while dispersing the antioxidants, light absorbers, stabilizers and curing catalysts throughout the composition, and then forming an article.

The crosslinkable silane-containing polyolefin composition or the stabilizer masterbatch can further comprise a silicone-polyether dispersing agent, curing catalyst and/or other additives. The silicone-polyether dispersing agent aids in the dispersal of the antioxidants, light absorbers, and optionally other additives within the composition and improve the polymer processing. The curing agent promotes the hydrolysis and condensation of the hydrolysable silyl group bonded to the polyolefin, thereby effecting a faster cure under less harsh curing conditions.

The crosslinkable silane-containing polyolefin compositions can be formed into a variety of shapes or articles and can be crosslinked by exposing the composition to moisture (for example, water).

DETAILED DESCRIPTION OF THE INVENTION

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all subranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "masterbatch", as used herein, refers to a solid composition in which antioxidant, processing stabilizer, light stabilizer, light absorber and optionally other additives are dispersed at high concentrations in a carrier polymer, plastic, rubber, or elastomer; for example, a polyolefin. The carrier polymer, plastic, rubber or elastomer is compatible with the polyolefin containing at least one hydrolysable silyl group in which the masterbatch may be blended, whereby the crosslinkable silane-containing polyolefin composition obtains properties from the masterbatch.

The term "organic compound", as used herein, refers to any member of a large class of chemical compounds whose molecules contain a carbon atom.

The invention is directed to a crosslinkable silane-containing polyolefin composition comprising: a polyolefin containing (a) at least one hydrolysable silyl group; (b) a sterically hindered phenol antioxidant; (c) a phosphite processing stabilizer; (d) a sterically hindered amine light stabilizer; (e) a substituted benzotriazol ultraviolet light absorber; and (f) a curing catalyst.

In an embodiment of the invention, the crosslinkable silane-containing polyolefin composition comprises:
90 to 99.95 weight percent of the polyolefin containing at least one hydrolysable silyl group (a);
0.01 to 4 weight percent of the sterically hindered phenol antioxidant (b);
0.01 to 2 weight percent of the phosphite processing stabilizer (c);
0.01 to 2 weight percent of the sterically hindered amine light stabilizer (d);
0.01 to 2 weight percent of the substituted benzotriazol ultraviolet light absorber (e); and
0.01 to 2 weight percent of the curing catalyst (f);
wherein the weight percents are based upon the total weight of components (a) through (f).

In another embodiment of the invention, a particularly useful crosslinkable silane-containing polyolefin composition comprises:
95 to 99.1 weight percent of the polyolefin containing at least one hydrolysable silyl group (a);
0.3 to 1 weight percent of the sterically hindered phenol antioxidant (b);
0.05 to 0.15 weight percent of the phosphite processing stabilizer (c);
0.05 to 0.15 weight percent of the sterically hindered amine light stabilizer (d);
0.05 to 0.5 weight percent of the substituted benzotriazol ultraviolet light absorber (e); and
0.01 to 1.5 weight percent of the curing catalyst (f);
(a) wherein the weight percents are based upon the total weight of components (a) through (f).

The invention is also directed to a stabilizer masterbatch composition comprising (a) a polyolefin; (b) a sterically hindered phenol antioxidant; (c) a phosphite processing stabilizer; (d) a sterically hindered amine light stabilizer; and (e) a substituted benzotriazol ultraviolet light absorber.

In an embodiment of the invention, the stabilizer masterbatch composition comprises:
50 to 99.8 weight percent of the polyolefin (a);
0.05 to 20 weight percent of the sterically hindered phenol antioxidant (b);
0.05 to 20 weight percent of the phosphite processing stabilizer (c);
0.05 to 20 weight percent of the sterically hindered amine light stabilizer (d); and
0.05 to 20 weight percent of the substituted benzotriazol ultraviolet light absorber (e),
wherein the weight percents are based upon the total weight of components (a) through (e).

The stabilizer masterbatch composition can be used at levels of 1 weight percent to 20 weight percent, based upon the total weight of the polyolefin containing at least hydrolysable silyl group, component (a) of the crosslinkable silane-containing polyolefin composition above, in the preparation of the crosslinkable-silane containing polyolefin composition. The polyolefin used in the preparation of the stabilizer masterbatch may be the same as or different from the polyolefin that is used to prepare the polyolefin containing at least one silyl group (a), above, but such polyolefins are preferably compatible with one another.

Polyolefin

Polyolefin, as that term is used herein, is a thermoplastic resin, which is a material that softens when heated and hardens when cooled. It can be a homopolymer or a copolymer produced from two or more comonomers, or a blend of two or more of these polymers. The polymers can be crystalline, amorphous, or combination thereof. The polymers can be block or random copolymers.

The monomers useful in the production of these homopolymers and copolymers can have 2 to 20 carbon atoms, and preferably 2 to 12 carbon atoms and at least one unsaturated carbon-carbon bond. Representative examples of the monomers are alpha-olefins, such as ethylene, propylene, 1-butene, 1-hexene, 4-methyl-1-pentene, and 1-octene; unsaturated esters, such as vinyl acetate, ethyl acrylate, methyl acrylate, methyl methacrylate, t-butyl acrylate, n-butyl acrylate, n-butyl methacrylate, 2-ethylhexyl acrylate and other alkyl acrylates; diolefins, such as 1,4-pentadiene, 1,3-hexadiene, 1,5-hexadiene, 1,4-octadiene, and ethylidene norbornene; aromatic olefins, such as styrene, vinyl naphthalene, 4-methylstyrene, alpha-methyl styrene and 4-chlorostyrene; nitrile olefins, such as acrylonitrile, methacrylonitrile, and alpha-chloroacrylonitrile; vinyl ketones such as vinyl methyl ketone and vinyl ethyl ketone; vinyl halides, such as vinyl chloride, vinylidene chloride, tetrafluoroethylene, chloro-tri-fluoroethylene; unsaturated acids, such as acrylic acid, methacrylic acid, and maleic acid; unsaturated silane, such as trimethoxy-vinyl-silane, and 2-methylacrylic acid 3-(trimethoxy-silanyl)-propyl ester, and vinyl alcohol.

Homopolymers are made from a single olefin. Representative examples of homopolymer polyolefins are polyvinyl chloride, polyvinylidene chloride, polytetra-fluoroethylene, polyacrylonitrile, polyethylene, polypropylene and polybutylene.

Copolymers are made using two or more monomers. Copolymers include those polymers made from ethylene and unsaturated esters; ethylene and unsaturated acids; ethylene and one or more alpha-olefin of 3 to 12 carbon atoms; propylene and one or more alpha-olefins of 4 to 12 carbon atoms.

The copolymer of ethylene and unsaturated esters can be made using alkyl acrylates, alkyl methacrylate, and vinyl carboxylates. The alkyl group can have 1 to 8 carbon atoms and preferably from 1 to 4 carbon atoms. The carboxylate group can have 2 to 8 carbon atoms and preferably 2 from 2 to 5 carbon atoms. The portion of the copolymer attributed to the ester comonomer can be in the range of 5 to 50 weight percent based upon the weight of the copolymer, and preferably in the range of 15 to 40 weight percent. Illustrative examples of acrylates and methacrylate are methyl acrylate, ethyl acrylate, n-butyl acrylate, t-butyl acrylate, 2-ethylhexyl acrylate, methyl methacrylate, and n-butyl methacrylate. Illustrative examples of vinyl carboxlyates are vinyl acetate, vinyl propionate and vinyl butanoate. The melt index of the ethylene and unsaturated ester copolymers can be in the range of 0.5 to 50 grams per 10 minutes, and preferably in the range of 2 to 25 grams per 10 minutes. The melt index is determined under ISO R 1133 at a temperature of 190° C. and weight of 2160 grams.

Copolymers of ethylene and one or more alpha-olefins having 3 to 12 carbon atoms can be made using propylene, 1-butylene, 1-hexene, 4-methyl-1-pentene, 1-octene, 1,4-pentadiene, 1,3-hexadiene, 1,5-hexadiene, 1,4-octadiene, and ethylidene norbornene. The portion of the copolymer attributed to the alpha-olefin can be in the range of 1 to 49 weight percent based upon the weight of the copolymer, and preferably in the range of 15 to 40 weight percent based upon the weight of the copolymer. A third monomer can be used such as a different alpha-olefin or a diene. The third comonomer can be present in an amount of 1 to 15 weight percent, and preferably from 1 to 10 weight percent, based on weight of the terpolymer. The density of the copolymer of ethylene and one or more alpha-olefins can be in the range of from 0.870 to 0.914 gram per cubic centimeter.

Polyethylene is particularly well suited for the potable water applications because of its low color, low taste and ease in incorporating the hydrolysable silyl group. Polyethylene can be produced using low or high pressures and in the gas phase or liquid phase using solutions or slurries. Low pressure polyethylene processes are typically run at pressures below 47,880 pascal whereas high pressure processes are typically run at pressures above 718,205 pascal. Polyethylene polymer can include low density homopolymers of ethylene made using high pressure processes, linear low density polyethylene, very low density polyethylene, medium density polyethylene and high density polyethylene. The polyethylene can have a density in the range of 0.86 to 0.95 gram per cubic centimeter. The polyethylenes can be homogeneous or heterogeneous. The homogeneous polyethylene usually have a polydispersity, defined as the weight average molecular weight divided by the number average molecular weight, in the range of from 1.5 to 3.5, and are characterized by a single and relatively low DSC melting point. The heterogeneous polyethylene has a polydispersity greater than 3.5. The melt index of the polyethylene ranges from 0.1 to 50 grams per 10 minutes, preferably 0.5 to 10 grams per 10 minutes, as determined using the ASTM D1505 Test Method.

Medium density and high density polyethylene are preferred for making pipes, valves and other articles for potable water uses. Medium density polyethylene has a density range of 0.926 to 0.940 g/cm$^3$. High density polyethylene has a density greater than 0.941 g/cm$^3$, very low levels of branching and a high crystalline structure. High density polyethylene has stronger intermolecular forces, higher tensile strength and higher use temperatures than the lower-density polyethylenes.

Polyolefin Containing at Least One Hydrolysable Silyl Group

The term "polyolefin containing at least one hydrolysable silyl group", as used herein, refers to a polyolefin (as referred to above in the paragraphs following "polyolefin" and including all those types described therein) that contains a silicon atom that is chemically bonded to the polyolefin resin through a covalent carbon-silicon bond and that is also chemically bonded to at least one hydrolysable group. The hydrolysable group bonded to the silicon atom contains a heteroatom of oxygen or nitrogen, which is covalently bonded to the silicon atom through a silicon-heteroatom single bond. The polyolefin containing at least hydrolysable silyl group may be prepared by copolymerizing the silane containing a carbon-carbon double bond with the other monomers during the initial preparation of the polymer, or grafting silane containing a carbon-carbon double bond onto an already formed polyolefin polymer, usually initiated using peroxide or other free radical generators.

The polyolefin containing at least one hydrolysable silyl group preferably comprises at least one repeat unit of Formula (I) or at least one pendant group of Formula (II):

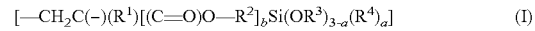

$$[-CH_2C(-)(R^1)][(C=O)O-R^2]_b Si(OR^3)_{3-a}(R^4)_a] \quad (I)$$

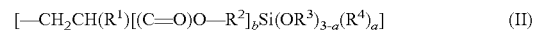

$$[-CH_2CH(R^1)][(C=O)O-R^2]_b Si(OR^3)_{3-a}(R^4)_a] \quad (II)$$

wherein in Formula (I) or Formula (II):

each occurrence of R$^1$ is independently hydrogen atom or a methyl group;

each occurrence of R$^2$ is independently a hydrocarbylene group containing from 1 to 12 carbon atoms and optionally containing at least one oxygen atom;

each occurrence of R$^3$ is independently selected from the group consisting of an alkyl group of 1 to 6 carbon atoms, an alkyl group of 1 to 6 carbon atoms and containing at least one oxygen atom, and an alkyl group of 1 to 6 carbon atoms in which two R$^3$ groups are covalently bonded together through a carbon-carbon bond to form a ring containing two oxygen atoms, one silicon atom, and 2 to 12 carbon atoms;

each occurrence of R$^4$ is an alkyl group of 1 to 4 carbon atoms; and each occurrence of the subscripts a and b is independently an integer where a is 0 to 2; and b is 0 or 1, with the proviso that when b is 0, the silicon atom is covalently bonded to a carbon atom to form —CH$_2$—C(-)(R$^1$)Si(OR$^3$)$_{3-a}$(R$^4$)$_a$ or —CH$_2$—CH(R$^1$)Si(OR$^3$)$_{3-a}$(R$^4$)$_a$ group.

Silanes useful in the preparation of the polyolefin containing at least one hydrolysable group have the general formula (III):

wherein:

R$^1$ is a hydrogen atom or a methyl group;

each occurrence of R$^2$ is independently a hydrocarbylene group containing from 1 to 12 carbon atoms and optionally containing at least one oxygen atom;

each occurrence of R$^3$ is independently selected from the group consisting of an alkyl group of 1 to 6 carbon atoms, an alkyl group of 1 to 6 carbon atoms and containing at least one oxygen atom, and an alkyl group of 1 to 6 carbon atoms in which two R$^3$ groups are covalently bonded together through a carbon-carbon bond to form a ring containing two oxygen atoms, one silicon atom, and 2 to 12 carbon atoms;

each occurrence of R$^4$ is an alkyl group of 1 to 4 carbon atoms; and each occurrence of the subscripts a and b is independently an integer where a is 0 to 2; and b is 0 or 1, with the proviso that when b is 0, the silicon atom is covalently bonded to a carbon atom to form CH$_2$=C(R$^1$)Si(OR$^3$)$_{3-a}$(R$^4$)$_a$.

Specific non-limiting examples of silanes useful in the preparation of the polyolefin containing at least one hydrolysable silyl group include trimethoxy-vinyl-silane, dimethoxy-methyl-vinyl-silane, methoxy-dimethyl-vinyl-silane, triethoxy-vinyl-silane, diethoxy-methyl-vinyl-silane, ethoxy-dimethyl-vinyl-silane, tripropoxy-vinyl-silane, dipropoxy-methyl-vinyl-silane, propoxy-dimethyl-vinyl-silane, tributoxy-vinyl-silane, 2,4-dimethyl-2-vinyl-[1,3,2]dioxasilinane, 2-methoxy-4-methyl-2-vinyl-[1,3,2]dioxasilinane, 2-methoxy-4,4,6-trimethyl-2-vinyl-[1,3,2]dioxasilinane, 2,4,4,6-tetramethyl-2-vinyl-[1,3,2]dioxasilinane, 2,5-dimethyl-2-vinyl-[1,3,2]dioxasilinane, 2-methoxy-5-methyl-2-vinyl-[1,3,2]dioxasilinane, acrylic acid 3-(methoxy-dimethyl-silanyl)-propyl ester, acrylic acid 3-(dimethoxy-methyl-silanyl)-propyl ester, acrylic acid 3-(trimethoxy-silanyl)-propyl ester, acrylic acid 3-(dimethoxy-methyl-silanyl)-propyl ester, 2-methyl-acrylic acid 3-(methoxy-dimethyl-silanyl)-propyl ester, 2-methyl-acrylic acid 3-(dimethoxy-methyl-silanyl)-propyl ester, 2-methyl-acrylic acid 3-(trimethoxy-silanyl)-propyl ester, 2-methyl-acrylic acid 3-(triethoxy-silanyl)-propyl ester, 2-methyl-acrylic acid 3-(tripropoxy-silanyl)-propyl ester, acrylic acid 3-(2,4,4,6-tetramethyl-[1,3,2]dioxasilinan-2-yl)-propyl ester, acrylic acid 3-(2,5-dimethyl-[1,3,2]dioxasilinan-2-yl)-propyl ester, acrylic acid 3-(2,4-dimethyl-[1,3,2]dioxasilinan-2-yl)-propyl ester, acrylic acid 3-(2-methoxy-4,4,6-trimethyl-[1,3,2]dioxasilinan-2-yl)-propyl ester, acrylic acid 3-(2-methoxy-5-methyl-[1,3,2]dioxasilinan-2-yl)-propyl ester, acrylic acid 3-(2-methoxy-4-methyl-[1,3,2]dioxasilinan-2-yl)-propyl ester, 2-methyl-acrylic acid 3-(2,4,4,6-tetramethyl-[1,3,2]dioxasilinan-2-yl)-propyl ester, 2-methyl-acrylic acid 3-(2,5-dimethyl-[1,3,2]dioxasilinan-2-yl)-propyl ester, 2-methyl-acrylic acid 3-(2,4-dimethyl-[1,3,2]dioxasilinan-2-yl)-propyl ester, 2-methyl-acrylic acid 3-(2-methoxy-4,4,6-trimethyl-[1,3,2]dioxasilinan-2-yl)-propyl ester, 2-methyl-acrylic acid 3-(2-methoxy-5-methyl-[1,3,2]dioxasilinan-2-yl)-propyl ester, 2-methyl-acrylic acid 3-(2-methoxy-4-methyl-[1,3,2]dioxasilinan-2-yl)-propyl ester, and mixtures thereof.

In the grafting of the silane onto the polyolefin backbone, an organic peroxide is often used to initiate and propagate the grafting reaction. The organic peroxide is a compound that decomposes under thermal conditions and forms a free radical site in a polyolefin. The silane containing a reactive carbon-carbon double bond reacts with the free radical site in the polyolefin, thereby forming a covalent bond between the silane and the polymer.

Specific non-limiting examples of peroxides include dicumyl peroxide, di-tert-butyl peroxide, benzoyl peroxide, 2,5-di-(peroxybenzoate)hexyne-3; 1,4-bis(t-butyl peroxyisopyl)benzene, lauroyl peroxide, t-butyl peracetate, 2,5-dimethyl-2,5-di(t-butylperoxy)hexane; t-butyl perbenzoate; t-butyl perphenylacetate; t-butyl perisobutylate; t-butyl perpivalate, cumyl perpivalate, and t-butyl perdiethylacetate.

It is understood that the term "polyolefin containing at least one hydrolysable group" can be either a single component; a composition composed of polymer molecules that have the same starting monomers but a different number of hydrolysable silyl groups per polymer molecule including polymer molecules without a hydrolysable silyl group, or a blend of different types of polyolefins containing at least one hydrolysable group. The composition of polyolefin containing at least one hydrolysable group may contain different number of hydrolysable silyl groups as a result of the random incorporation of the silane into the polymer during the polymerization or grafting reactions.

Sterically Hindered Phenol Antioxidant

The term "sterically hindered phenol antioxidant", as used herein, refers to an organic compound in which a hydroxyl group is chemically bonded to an aromatic hydrocarbon carbon atom and in which the adjacent carbon atoms to the carbon containing the hydroxyl group are bonded to a secondary or preferably a tertiary carbon atom of an alkyl group. In an embodiment, sterically hindered phenol antioxidants useful in the invention may be described by the general formula (IV):

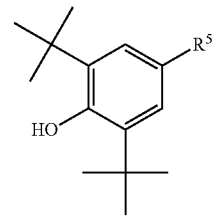

wherein in Formula (IV), R$^5$ is a monovalent or polyvalent organic radical of from 1 to 50 carbon atoms and optionally containing substituents selected from group consisting of hydroxyl group —OH; amide group —C(=O)N(-)$_2$, ester group —C(=O)O—; isocyanurate group

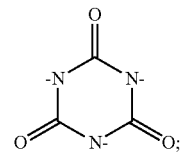

ether group —O—; amine group (-)$_2$NH; hydrazide —C(=O)N(-)NH(-)$_2$-; sulfide group —S—; and mixtures thereof.

Specifically, the sterically hindered phenol antioxidant may have a molecular weight of between 300 grams/mole to 1,500 grams/mole. The sterically hindered phenol antioxidant may contain at least two phenolic groups per molecule having the general formula (V):

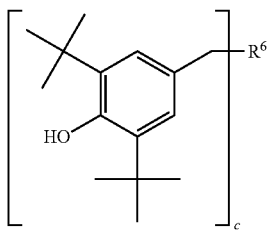

wherein in Formula (V), $R^6$ is a divalent, trivalent or tetravalent organic group of from 1 to 50 carbon atoms and optionally containing substituents selected from group consisting of a hydroxyl group —OH; amide group —C(═O)N(-)$_2$; ester group —C(═O)O—; isocyanurate group

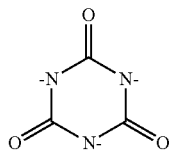

ether group —O—; amine group (-)$_2$NH; hydrazide —C(═O)N(-)NH(-)$_2$-; sulfide group —S—; and mixtures thereof; and the subscript c is an integer of from 2 to 4.

A mixture of sterically hindered phenol antioxidants in which the mixture contains antioxidants containing a single phenolic group and multiple phenolic groups is preferred. Although not to be held to any theory, the mixture of sterically hindered phenol antioxidants is believed to migrate to the site at different diffusion rates, and thereby enabling the antioxidant package to provide chlorine resistance to the crosslinkable polyolefin compositions over long periods of use.

Representative and non-limiting examples of sterically hindered phenol antioxidants include 4-[[3,5-bis[(3,5-ditert-butyl-4-hydroxyphenyl)methyl]-2,4,6-trimethylphenyl]methyl]-2,6-ditert-butylphenol; octadecyl 3-(3,5-ditert-butyl-4-hydroxyphenyl)propanoate; 3-(3,5-ditert-butyl-4-hydroxyphenyl)-N'-[3-(3,5-ditert-butyl-4-hydroxyphenyl)propanoyl]propanehydrazide; ethylenebis(oxyethylene)bis-3,5-tert-butyl-4-hydroxy-m-tolyl)-propionate; pentaerythritol tetrakis(3-(3,5-di-tert-4-hydroxyphenyl)propionate; thiodiethylene bis[3-(3,5-di-tert-butyl-4-hydroxyphenyl)propionate-N,N'-hexane-1,6-diylbis(3-(3,5-di-tert-butyl-4-hydroxylphenylpropionamide); 1,3,5-tris-(3,5-di-tert-butyl-4-hydroxybenzyl)-1,3-5-triazine-2,4,6(1H,3H,5H-)-trione; 3,5-di-tert-butyl-4-hydroxy-toluene; 4,4-methylene-bis(3,5-di-tert-butylphenol); and mixtures thereof.

Phosphite Processing Stabilizer

The term "phosphite processing stabilizer", as used herein, refers to a secondary antioxidant that reacts with hydroperoxides that formed on the polyolefin polymer during processing and prevents process induced degradation and extends the performance of the sterically hindered phenol antioxidants. The phosphite processing stabilizer contains three oxygen phosphorus single bonds. In an embodiment, the phosphite processing stabilizer has the general formula (VI):

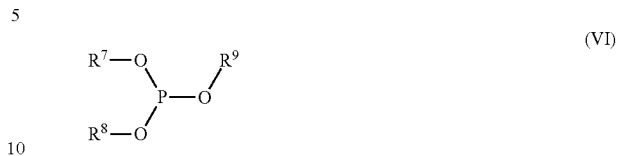

wherein in Formula (VI), $R^7$ is selected from the group consisting of a monovalent hydrocarbon containing from 1 to 25 carbon atoms, a monovalent hydrocarbon containing from 1 to 25 carbon atoms and at least one heteroatom selected from the group consisting of oxygen atom, nitrogen atoms and sulfur atom, and a polyvalent hydrocarbon containing from 1 to 25 carbon atoms in which at least one carbon atom is bonded to the oxygen of the oxygen-phosphorus group and at least one carbon atom is covalently bonded to a carbon atom of the $R^8$ group;

$R^8$ is selected from the group consisting of a monovalent hydrocarbon containing from 1 to 25 carbon atoms, a monovalent hydrocarbon containing from 1 to 25 carbon atoms and at least one heteroatom selected from the group consisting of oxygen atom, nitrogen atoms and sulfur atom, and a polyvalent hydrocarbon containing from 1 to 25 carbon atoms in which at least one carbon atom is bonded to the oxygen of the oxygen-phosphorus group and at least one carbon atom is covalently bonded to a carbon atom of the $R^7$ group; and $R^9$ is a monovalent hydrocarbon containing 1 to 25 carbon atoms and optionally contains at least one heteroatom selected from the group consisting of oxygen atom, nitrogen atoms and sulfur atom.

In particular, the phosphite processing stabilizer may contain $R^7$ and $R^8$ groups that are monovalent alkyl-substituted aromatic hydrocarbon groups. The $R^7$ and $R^8$ groups inhibit the hydrolysis of the phosphite processing stabilizer during processing and curing to the crosslinkable polyolefin composition.

Representative and non-limiting examples of phosphate processing stabilizers include tris(2,4-di-tert-butylphenyl) phosphite; 2-(2,4,8,10-tetratert-butylbenzo[d][1,3,2]benzodioxaphosphepin-6-yl)oxy-N,N-bis[2-(2,4,8,10-tetratert-butylbenzo[d][1,3,2]benzodioxaphosphepin-6-yl)oxyethyl]ethanamine; bis(2,4-di-tert-butyl-6-methylphenyl)-ethylphosphite; 3,9-bis-(2,4-di-tert-butyl-phenoxy)-2,4,8,10-tetraoxa-3,9-diphospha-spiro[5.5]undecane; and mixtures thereof.

Sterically Hindered Amine Light Stabilizer

In an embodiment, a sterically hindered amine light stabilizer is an organic compound containing at least one occurrence of the structural unit of the general formula (VII):

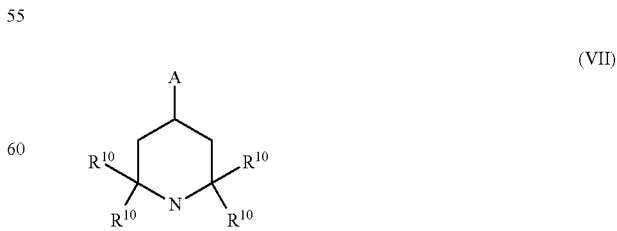

wherein in Formula (VII),

A is an atom selected from the group consisting of nitrogen, carbon or oxygen, with the proviso that the open valences of the atoms A and nitrogen are filled with a hydrogen, an organic group or a long pair of electrons and each occurrence of $R^{10}$ is independently an alkyl group of from 1 to 6 carbon atoms.

In particular, the sterically hindered amine light stabilizer may be a monomeric, oligomeric or polymeric molecule of the general formulae (VIII) or (IX):

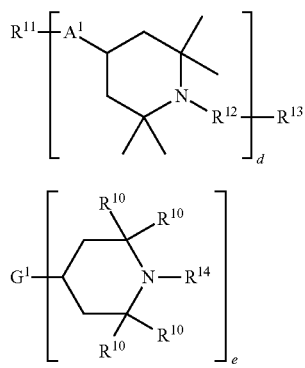

wherein in Formula (VIII), each occurrence of $A^1$ is independently selected from the group consisting of alkenylene of 1 to 10 carbon atoms, an oxygen atom and $NR^{11}$;

$R^{11}$ is selected from the group consisting of hydrogen, a monovalent hydrocarbon group of 1 to 10 carbon atoms, an amino group —$NR^{10}{}_2$ where $R^{10}$ is an alkyl group of from 1 to 6 carbon atoms, hydroxyl group, and mercaptan group;

each occurrence of $R^{12}$ is independently a divalent alkylene, alkenylene, arylene or aralkylene group of 1 to 20 carbon atoms or a divalent organic group of 1 to 20 carbon atoms containing at least one ether, ester, ketone, amide, amine, thioether, or thioester group;

$R^{13}$ is selected from the group consisting of hydrogen, a monovalent hydrocarbon group of 1 to 10 carbon atoms, an amino group —$NR^{10}{}_2$ where $R^{10}$ is an alkyl group of from 1 to 6 carbon atoms, hydroxyl group, and mercaptan group; and the subscript d is an integer from 1 to 100;

wherein in Formula (IX), each occurrence of $R^{10}$ is independently an alkyl group of from 1 to 6 carbon atoms;

each occurrence of $R^{14}$ is independently selected from the group consisting of hydrogen or monovalent alkyl, alkenyl, aryl, aralkyl of from 1 to 10 carbon atoms;

$G^1$ is an organic group of 1 to 1000 carbon atoms and optionally containing at least one triazine, pyrimidine, pyridine, [1,3,5]triazinane-2,4,6-trione, [1,3,5]triazine-2,4,6-triamine ether, ester, ketone, amide, amine, thioether, or thioester group; and the subscript e is an integer from 1 to 100.

Representative, non-limiting examples of the sterically hindered amine light stabilizer include 3-(2,2,6,6-tetramethyl-piperidin-4-yloxy)-propionic acid, 4-(2,2,6,6-tetramethyl-piperidin-4-yl)-butyric acid, poly-[4-(2,2,6,6-tetramethyl-piperidin-4-yl)-butyricacid]ester, poly[[6-[(1,1,3,3-tetramethybutyl)amino]-1,3,5-triazine-2,4-diyl][(2,2,6,6-tetramethyl-4-piperidinyl)imino]-1,6-hexanediyl[(2,2,6,6-tetramethyl-4-piperidiny)imino]], bis(2,2,6,6-tetramethyl-4-piperidyl)maleate, bis(2,2,6,6-tetraethyl-4-piperidyl)maleate, bis(2,2,6,6-tetramethyl-4-piperidyl)maleate, bis(2,2,6,6-tetrahexyl-4-piperidyl)sebaceate, bis(1,2,2,6,6-pentamethyl-4-piperidinyl)-2-butyl-2-(4-hydroxy-3,5-di-tert-butylbenzyl)propanedioate, poly-[7-(4-hydroxy-2,2,6,6-tetramethyl-piperidin-1-yl)-4-oxo-heptanoic acid]ester, poly-[6-(4-hydroxy-2,2,6,6-tetraethyl-piperidin-1-yl)-hexanoic acid]ester, poly-[7-(4-hydroxy-2,2,6,6-tetramethyl-piperidin-1-yl)-4-oxo-heptanoic acid]ester, 7-(4-hydroxy-2,2,6,6-tetramethyl-piperidin-1-yl)-4-oxo-heptanoic acid 1-tert-butyl-2,2,6,6-tetramethyl-piperidin-4-yl ester, 7-(4-hydroxy-2,2,6,6-tetramethyl-piperidin-1-yl)-4-oxo-heptanoic acid, 8-(4-hydroxy-2,2,6,6-tetramethyl-piperidin-1-yl)-5-oxo-octanoic acid, 6-(4-hydroxy-2,2,6,6-tetramethyl-piperidin-1-yl)-hexanoic acid, 4-(4-hydroxy-2,2,6,6-tetramethyl-piperidin-1-yl)-benzoic acid, polymer resulting from the reaction of dimethylbutanedioate with 4-hydroxy-2,2,6,6-tetramethyl-1-piperidine ethanol, and mixtures thereof.

Substituted Benzotriazol Ultraviolet Light Absorber

The term "substituted benzotriazol", as used herein, refers to an organic compound containing a benzotriazol group chemical bonded to hydroxyl-containing aromatic compound having the general Formula (X)

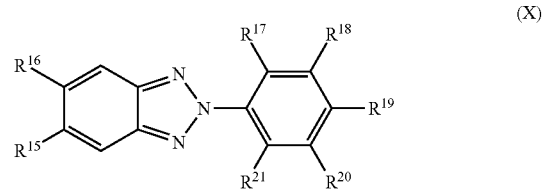

wherein in Formula (X), $R^{15}$ is a hydrogen atom or fluoride, chloride, iodide, nitrile, hydroxyl, carboxyl or alkyl group of from 1 to 10 carbon atoms;

$R^{16}$ is a hydrogen atom or fluoride, chloride, iodide, nitrile, hydroxyl, carboxyl or alkyl group of from 1 to 10 carbon atoms;

$R^{17}$ is a hydrogen atom or hydroxyl, alkoxy, carboxyl, nitrile, chloride or alkyl group of from 1 to 10 carbon atoms;

$R^{18}$ is a hydrogen atom or a monovalent alkyl group containing from 1 to 10 carbon atoms;

$R^{19}$ is a hydrogen atom or hydroxyl, alkoxyl, carboxyl, nitrile, chloride or alkyl group of from 1 to 10 carbon atoms;

$R^{20}$ is a hydrogen atom or a monovalent alkyl group containing from 1 to 100 carbon atoms and optionally containing at least one ether, ester, hydroxyl, amino or carboxyl group; and $R^{21}$ is a hydrogen atom or hydroxyl, carboxyl, nitrile, chloride or an alkyl group of from 1 to 10 carbon atoms; and with the proviso that at least one of $R^{17}$ or $R^{19}$ is a hydroxyl group.

Representative, non-limiting examples of the substituted benzotriazol light absorber include 2-benzotriazol-2-yl-6-tert-butyl-4-methyl-phenol, 3-(3-3enzotriazol-2-yl-5-tert-butyl-4-hydroxy-phenyl)-propionic acid 2-(2-hydroxy-ethoxy)-ethyl ester, 3-(3-Benzotriazol-2-yl-5-tert-butyl-4-hydroxy-phenyl)-propionic acid 2-[2-(2-hydroxy-ethoxy]-ethyl ester, 3-(3-benzotriazol-2-yl-5-tert-butyl-4-hydroxy-phenyl)-propionic acid 2-{2-[2-(2-hydroxy-ethoxy)-ethoxy]-ethoxy}-ethyl ester, 3-(3-benzotriazol-2-yl-5-tert-butyl-4-hydroxy-phenyl)-propionic acid, 4-benzotriazol-2-yl-2-tert-butyl-6-methyl-phenol, 4-benzotriazol-2-yl-2,6-di-tert-butyl-phenol, 2-tert-butyl-4-methyl-6-(5-methyl-benzotriazol-2-yl)-phenol, 2-(3-tert-butyl-2-hydroxy-5-methyl-phenyl)-2H-benzotriazole-5-carbonitrile, 2-tert-butyl-6-(5,6-dichloro-benzotriazol-2-yl)-4-methyl-phenol, 2-(5-chloro-benzotriazol-2-yl)-4,6-bis-(1-methyl-1-phenyl-ethyl)-phenol, 2-benzotriazol-2-yl-4,6-bis-(1-methyl-1-phenyl-ethyl)-phenol, and mixtures thereof.

Curing Catalysts

The term "curing catalyst", as used herein, refers to any catalyst that is capable of promoting the water cure reaction with a polyolefin containing at least one hydrolysable silyl group. Curing catalysts include mineral acids such as boric acid, phosphoric acid, sulfuric acid, sulfonic acid; organic acids, such as carboxylic acids, acid cation-exchange resins, alkyl and arylsulfonic acids; Lewis acids; group 1A or 1B metal salts of hydroxide; amines; metal alkoxides, such as tin alkoxides, titanium alkoxides, aluminum alkoxides, vanadium alkoxides; metal oxides, such as iron oxides, vanadium oxides, tin oxides; metal carboxylates, such at tin carboxylates, cobalt carboxylates, zinc carboxylates, iron carboxylates, bismuth carboxylates; metal chelated with organic ligands, such a acetoacetate complexes of titanium, aluminum, iron, and mixtures thereof.

Representative, non-limiting examples of curing catalysts include dibutyltin diacetate, dibutyl tin dilaurate, dioctyltin dilaurate, dibutyltin dioleate, stannous acetate, cobalt naphthenate, zinc caprylate, iron 2-ethylhexanoate, tetra-butyl titanate, tetra-ethyl titanate, tetra-nonyl titanate, and mixtures thereof. Particularly useful catalysts include metal oxides, chelates or alkoxides of titanium, aluminum, iron and zinc because these metal catalysts promote cure without the need for catalysts based upon tin salts.

Other Additives

Other additives can be incorporated in the crosslinkable silane-containing polyolefin compositions and/or the stabilizer masterbatch compositions of the invention. Such additives include, but are not limited to, coupling agents, anti-static agents, pigments, dyes, nucleating agents, reinforcing fillers, slip agents, plasticizers, processing aids, lubricants, viscosity control agents, tackifiers, anti-blocking agents, surfactants, extender oils, metal deactivators, flame retardant fillers, polymer additives, smoke suppressants, crosslinking agents, and mixtures thereof.

The additives can be incorporated into the crosslinkable silane-containing polyolefin compositions in amounts ranging from 0.1 to 50 percent by weight percent based on the total weight of the components (a) through (f) of such compositions. Similarly, the additives can be incorporated into the stabilizer masterbatch in amounts ranging from 0.1 to 50 weight percent based on the total weight of the components (a) through (e) of such compositions.

Particularly useful processing aids include silicone-polyether copolymers. The silicone-polyether copolymers can have the general formula (XI):

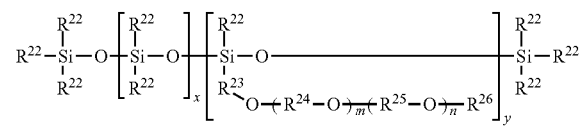

(XI)

wherein in Formula (XI), each occurrence of $R^{22}$ is independently a monovalent hydrocarbon group containing from 1 to 6 carbon atoms;

each occurrence of $R^{23}$ is independently a divalent hydrocarbon containing from 1 to 10 carbon atoms;

each occurrence of $R^{24}$ is a divalent, straight chain alkylene group containing from 2 to 6 carbon atoms;

each occurrence of $R^{25}$ is a divalent, branched alkylene group containing from 3 to 6 carbon atoms;

each occurrence of $R^{26}$ is selected from the group consisting of hydrogen, a hydrocarbon group containing from 1 to 12 carbon atoms, and a $—C(=O)R^{27}$ group, wherein $R^{27}$ is a hydrogen or a hydrocarbon group containing from 1 to 20 carbon atoms; and each occurrence of the subscripts m, n, x and y is an integer wherein m is 1 to 100; n is 0 to 100; x is 10 to 200; and y is 1 to 20.

Representative, non-limiting examples of the polyether copolymer of Formula (XI) include $(CH_3)_3SiO—[Si(CH_3)_2O—]_{20}[SiCH_3((CH_2)_3O(CH_2CH_2O)_{10}(CH_2CH(CH_3)O)_{20}H)O—]_3Si(CH_3)_3$;

$(CH_3)_3SiO—[Si(CH_3)_2O—]_{50}[SiCH_3((CH_2)_3O(CH_2CH_2O)_{10}(CH_2CH(CH_3)O)_{20}H)O—]_8Si(CH_3)_3$;

$(CH_3)_3SiO—[Si(CH_3)_2O—]_{75}[SiCH_3((CH_2)_3O(CH_2CH_2O)_{10}(CH_2CH(CH_3)O)_{10}H)O—]_8Si(CH_3)_3$;

$(CH_3)_3SiO—[Si(CH_3)_2O—]_{50}[SiCH_3((CH_2)_3O(CH_2O)_5H)O—]_5Si(CH_3)_3$;

$(CH_3)_3SiO—[Si(CH_3)_2O—]_{50}[SiCH_3((CH_2)_3O(CH_2O)_7H)O—]_5Si(CH_3)_3$;

$(CH_3)_3SiO—[Si(CH_3)_2O—]_{50}[SiCH_3((CH_2)_3O(CH_2O)_{10}H)O—]_5Si(CH_3)_3$;

$(CH_3)_3SiO—[Si(CH_3)_2O—]_{70}[SiCH_3((CH_2)_3O(CH_2O)_5H)O—]_5Si(CH_3)_3$;

$(CH_3)_3SiO—[Si(CH_3)_2O—]_{70}[SiCH_3((CH_2)_3O(CH_2O)_7H)O—]_5Si(CH_3)_3$;

$(CH_3)_3SiO—[Si(CH_3)_2O—]_{70}[SiCH_3((CH_2)_3O(CH_2O)_{10}H)O—]_5Si(CH_3)_3$;

$(CH_3)_3SiO—[Si(CH_3)_2O—]_{75}[SiCH_3((CH_2)_3O(CH_2O)_7H)O—]_5Si(CH_3)_3$;

$(CH_3)_3SiO—[Si(CH_3)_2O—]_{75}[SiCH_3((CH_2)_3O(CH_2O)_{10}H)O—]_5Si(CH_3)_3$;

$(CH_3)_3SiO—[Si(CH_3)_2O—]_{75}[SiCH_3((CH_2)_3O(CH_2O)_5H)O—]_5Si(CH_3)_3$;

$(CH_3)_3SiO—[Si(CH_3)_2O—]_{75}[SiCH_3((CH_2)_3O(CH_2O)_7H)O—]_5Si(CH_3)_3$;

$(CH_3)_3SiO—[Si(CH_3)_2O—]_{75}[SiCH_3((CH_2)_3O(CH_2O)_{10}H)O—]_5Si(CH_3)_3$;

$(CH_3)_3SiO—[Si(CH_3)_2O—]_{75}[SiCH_3((CH_2)_3O(CH_2O)_7H)O—]_{10}Si(CH_3)_3$;

$(CH_3)_3SiO—[Si(CH_3)_2O—]_{75}[SiCH_3((CH_2)_3O(CH_2O)_7H)O—]_{10}Si(CH_3)_3$;

$(CH_3)_3SiO—[Si(CH_3)_2O—]_{75}[SiCH_3((CH_2)_3O(CH_2O)_{10}H)O—]_{10}Si(CH_3)_3$;

$(CH_3)_3SiO—[Si(CH_3)_2O—]_{75}[SiCH_3((CH_2)_3O(CH_2O)_{20}H)O—]_{10}Si(CH_3)_3$;

$(CH_3)_3SiO—[Si(CH_3)_2O—]_{75}[SiCH_3((CH_2)_3O(CH_2O)_{22}(CH_2CH(CH_3)O)_8H)O—]_{10}Si(CH_3)_3$;

$(CH_3)_3SiO—[Si(CH_3)_2O—]_{100}[SiCH_3((CH_2)_3O(CH_2CH_2O)_{10}(CH_2CH(CH_3)O)_{20}H)O—]_5Si(CH_3)_3$;

$(CH_3)_3SiO—[Si(CH_3)_2O—]_{50}[SiCH_3((CH_2)_3O(CH_2O)_{10}(CH_2CH(CH_3)O)_{10}CH_3)O—]_5Si(CH_3)_3$;

$(CH_3)_3SiO—[Si(CH_3)_2O—]_{70}[SiCH_3((CH_2)_3O(CH_2O)_{35}(CH_2CH(CH_3)O)_{40}CH_3)O—]_5Si(CH_3)_3$;

$(CH_3)_3SiO—[Si(CH_3)_2O—]_{70}[SiCH_3((CH_2)_3O(CH_2O)_{15}(CH_2CH(CH_3)O)_{15}CH_3)O—]_5Si(CH_3)_3$;

$(CH_3)_3SiO—[Si(CH_3)_2O—]_{75}[SiCH_3((CH_2)_3O(CH_2O)_{15}(CH_2CH(CH_3)O)_{15}CH_3)O—]_{15}Si(CH_3)_3$;

$(CH_3)_3SiO—[Si(CH_3)_2O—]^{100}[SiCH_3((CH_2)_3O(CH_2CH_2O)_{15}(CH_2CH(CH_3)O)_{20}CH_3)O—]_{15}Si(CH_3)_3$;

$(CH_3)_3SiO-[Si(CH_3)_2O-]_{75}[SiCH_3((CH_2)_3O(CH_2CH_2O)_{15}(CH_2CH(CH_3)O)_{15}COCH_3)O-]_5Si(CH_3)_3$;
$(CH_3)_3SiO-[Si(CH_3)_2O-]_{75}[SiCH_3((CH_2)_3O(CH_2CH_2O)_{13}(CH_2CH(CH_3)O)_{15}H)O-]_4-[SiCH_3((CH_2)_3O(CH_2CH_2O)_{35}(CH_2CH(CH_3)O)_{40}H)O-]Si(CH_3)_3$; and mixtures thereof.

A metal deactivator may be used to protect the cured composition from the metal ions that can migrate into the composition due to the copper, brass, iron or other metal or metal alloy. Suitable metal deactivators include sterically hindered phenolic compounds containing a hydrazide, amide or phosphite group.

A particularly useful metal deactivator is given by the formula (XII):

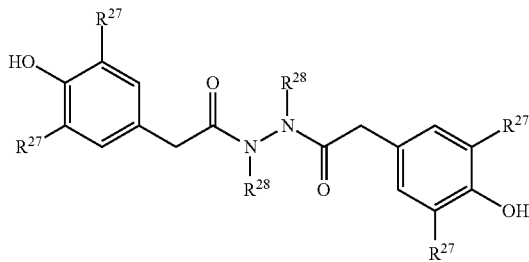

(XII)

wherein in Formula (XII), each occurrence of $R^{27}$ is independently a monovalent an alkyl, aryl or aralkyl group containing from 1 to 16 carbon atoms; and each occurrence of $R^{28}$ is independently a hydrogen atom or a monovalent alkyl, aryl or aralkyl group containing from 1 to 16 carbon atoms. More particularly, $R^{27}$ is a branched hydrocarbon containing 3 to 6 carbon atoms, and even more particularly, tert-butyl group and $R^{28}$ is hydrogen or methyl.

Representative, non-limiting examples of metal deactivators include 1,2-bis(3,5-di-tert-butyl-4-hydroxyhydrocinnamoyl)hydrazine, 2,2'-oxamidobis(ethyl-3-(3,5-di-tert-4-hydroxyphenyl)propionate, tris[2-tert-butyl-4-(5-tert-butyl-4-hydroxy-2-methylphenyl)sulfanyl-5-methylphenyl] phosphate, 2-[[2-[2-[3-(3,5-ditert-butyl-4-hydroxyphenyl)propanoyloxy]ethylamino]-2-oxoacetyl]amino]ethyl 3-(3,5-ditert-butyl-4-hydroxyphenyl)propanoate, and mixtures thereof.

Process for Making Compositions of the Invention

A polyolefin containing at least one hydrolysable silyl group can be prepared by introducing a polyolefin polymer, a silane of the general formula (III):

$$CH_2=C(R^1)[(C=O)O-R^2]_bSi(OR^3)_{3-a}(R^4)_a \quad (III)$$

wherein in Formula (III), $R^1$ is a hydrogen atom or a methyl group;

each occurrence of $R^2$ is independently a hydrocarbylene group containing from 1 to 12 carbon atoms and optionally containing at least one oxygen atom;

each occurrence of $R^3$ is independently selected from the group consisting of an alkyl group of 1 to 6 carbon atoms, an alkyl group of 1 to 6 carbon atoms and containing at least one oxygen atom, and an alkyl group of 1 to 6 carbon atoms in which two $R^3$ groups are covalently bonded together through a carbon-carbon bond to form a ring containing two oxygen atoms, one silicon atom, and 2 to 12 carbon atoms;

each occurrence of $R^4$ is an alkyl group of 1 to 4 carbon atoms;

each occurrence of the subscripts a and b is independently an integer where a is 0 to 2; and b is 0 or 1, with the proviso that when b is 0, the silicon atom is covalently bonded to a carbon atom to form $CH_2=C(R^1)Si(OR^3)_{3-a}(R^4)_a$; and a peroxide into an a mixer, thoroughly mixing, and then heating to melt the polyolefin composition, decompose the organic peroxide to generate free radicals, and graft the silane to the polyolefin.

Alternatively, the silane, peroxide and optionally a thermoplastic polymer carrier composition can be prepared first by mixing the components together, and this composition can be introduced into the mixer with the polyolefin, and the process completed as described above. The silane and peroxide composition can also be soaked into the polyolefin prior to introduction into the extruder. The composition is typically kneaded in the molten state at about 150° C. to 300° C., preferably 180° C. to 250° C., to accomplish the grafting.

The polyolefin containing at least one hydrolysable silyl group (a) can be prepared in the absence or presence of sterically hindered phenol antioxidant (b), phosphite processing stabilizer (c), sterically hindered amine light stabilizer (d), a substituted benzotriazol ultraviolet light absorber (e), curing catalyst (f), and optionally other additives, if desired, such as silicone-polyether copolymer process aids and metal deactivators. The stabilizers and other additives can be introduced into the extruder by means a stabilizer masterbatch composition comprising a polyolefin (a), a sterically hindered phenol antioxidant (b), a phosphite processing stabilizer (c), a sterically hindered amine light stabilizer (d), a substituted benzotriazol ultraviolet light absorber (e) and optionally other additives. The stabilizer masterbatch can be introduced with the polyolefin, silane and peroxide composition before heating and grafting has occurred, or the stabilizer masterbatch can be mixed with polyolefin containing at least one hydrolysable group (a) after it is formed. The process can involve a single mixing and grafting step, in which all the components are mixed and reacted together, or the process can involve two or more steps in which in the first step the polyolefin containing at least one hydrolysable silyl group (a) is formed, and then in a separate step, the stabilizers and other components are added, typically using a stabilizer masterbatch.

The crosslinkable silane-containing polyolefin composition is brought into contact with water in the form of a liquid or steam to be cured and forms a crosslinked silane containing composition. The crosslinkable silane-containing polyolefin composition can be exposed to moisture by placing the formed part into a bath, sauna or steam autoclave or by circulating water through the formed pipe and cured. Here, the curing zone is maintained at a temperature in the range of about room temperature to about 200° C., preferably 60° C. to 100° C., and the curing is effected for a period of about 10 seconds to about 10 days, preferably about 1 minute to about 1 day. Curing can also take place in steam for 2 to 5 hours or more.

Various types of melt-mixers and extruders such as a Brabender® mixer, Banbury® mixer, a roll mill, a Buss® co-kneader, a biaxial screw kneading extruder, and single or twin screw extruders can be used for mixing, grafting, and molding or extruding. A description of a conventional extruder can be found in U.S. Pat. No. 4,857,600, the contents of which are included in its entirety herein. A typical extruder has a hopper at its upstream end and a die at its downstream end. The hopper feeds into a barrel, which contains a screw. At the downstream end, between the end of the screw and the die, are a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1, preferably more than about 18:1.

In an embodiment, the stabilizer masterbatch composition can be made by a process comprising mixing polyolefin (a) with sterically hindered phenol antioxidant (b), phosphite processing stabilizer (c), sterically hindered amine light stabilizer (d), substituted benzotriazol light absorber (e), and optionally other additives in a mixer at temperatures of from 120° C. to 300° C. for a time sufficient to form a molten polymer and above the melting point of the components (b) through (e). In a more specific embodiment, the stabilizer masterbatch can be made by a process comprising the steps of (i) adding to polyolefin (a) additives of (b), (c), (d), and (e) having a melting point above 190° C., (ii) mixing the contents of (i) at a temperature of from 200° C. to 300° C. to melt and dissolve said additives into the polyolefin, (iii) cooling the polyolefin composition of (ii) to a temperature of 120° C. to 200° C., said temperature being lower than that of step (ii), (iv) adding to the contents of step (iii), at a lower temperature than that of step (iii), the remainder of additives (b), (c), (d), and (e) having a melting temperature at or below 190° C., (v) mixing the contents of (iv), and (vi) cooling the contents of (v) to room temperature.

Illustratively, the stabilizer masterbatch is typically prepared by mixing the polyolefin (a) with a sterically hindered phenol antioxidant (b), a phosphite processing stabilizer (c), a sterically hindered amine light stabilizer (d), a substituted benzotriazol light absorber (e), and optionally other additives in a mixer at temperatures sufficient to form a molten polymer and preferably above the melting point of the components (b) through (e). The temperature needs to be above the melting points of components (b) through (e) to ensure that the additives form a solution with the polymer once the stabilizer masterbatch is cooled. The additives can be mixed with the polyolefin in a single mixing process, or in a multi-step process. Typically, the single step mixing process mixes all the components together and the mixing temperature is in a range of from 120° C. to 300° C., preferably, in the range of from 200° C. to 250° C. The multi-step process involves (i) adding the high melting additives, which melt at a temperature above 190° C. to the polyolefin, (ii) mixing at a high temperature to melt and dissolve the high melting additives into the polyolefin, (iii) cooling the composition to a lower temperature, (iv) adding the low melting components, which melt at or below 190° C., at a lower temperature, (v) mixing, and then (vi) cooling. The high temperature mixing (ii) can occur at a temperature of from 200° C. to 300° C. and the low mixing temperature (v) of from 120° C. to 200° C. The advantage of the multi-step mixing process is to avoid the thermal decomposition of the low melting components during the mixing process.

The stabilizer masterbatch can be mixed using a variety of mixers, including various types of melt-mixers and extruders such as a Brabender® mixer, Banbury® mixer, a roll mill, a Buss® co-kneader, a biaxial screw kneading extruder, and single or twin screw extruders can be used for mixing, grafting, and molding or extruding.

As indicated above, various articles can be made from a cured composition of the crosslinkable silane-containing polyolefin compositions of the invention. Illustrative, non-limiting examples include potable water pipes, radiant floor heating pipes, central and district heating pipes and ducts, air conditioning pipes and ducts, pipes for transporting gases, compressed air, fluids, valves, bottles, fittings, joints, cylinders, and tanks.

For example, the crosslinkable silane-containing polyolefin compositions of the invention may be extruded through a die to form a pipe (for example, PEX-b pipe) and subsequently cured by exposure to moisture. When a crosslinkable silane-containing polyolefin is formed through the grafting reaction of a vinyltrimethoxysilane with polyethylene, and the crosslinking is performed in a secondary post-extrusion process by exposure to moisture, the resultant pipe is often referred to as PEX-b pipe. The crosslinked bonds are formed through hydrolysis of the methoxysilyl groups to form silanols and the condensation between two or more grafted silanol units, connecting the polyethylene chains with C—C—Si—O—Si—C—C bridges.

The following examples are intended to illustrate, but in no way limit the scope of the present invention. All parts and percentages are by weight and all temperatures are in degrees Celsius unless explicitly stated otherwise. All patents, other publications, and U.S. patent applications referred to in the instant application are incorporated herein by reference in their entireties.

EXAMPLES

Example 1. Preparation of a Stabilizer Masterbatch

Eltex 4040P and Eltex 4040A, polyethylene resins from SOLVAY, were dried for 4 hours at 80° C. Into a plastic bag was added 3200 grams of 4-[[3,5-bis[(3,5-ditert-butyl-4-hydroxyphenyl)methyl]-2,4,6-trimethylphenyl]methyl]-2,6-ditert-butyl phenol, 480 grams octadecyl 3-(3,5-ditert-butyl-4-hydroxyphenyl)propanoate, 400 grams of tri(2,4-ditert-butylphenyl)phosphate, 200 grams 2-(2,3,8,10-tetratert-butylbenzo[d][1,3,2]benzodioxaphosphepin-6-yl)oxy-N,N-bis[2-(2,4,8,10-tetratert-butylbenzo[d][1,3,2]benzodioxaphosphepin-6-yl)oxyethyl]ethanamine, 800 grams of 3-(3,5-di-tert-butyl-4-hydroxyphenyl)-N'-[3-(3,5-di-tert-butyl-4-hydroxyphenyl)propanoyl]propanohydrazide, 600 grams of butanedioic acid, dimethylester, polymer with 4-hydroxy-2,2,6,6-tetramethyl-1-piperidine ethanol, 600 grams of 2-tert-butyl-6-(5-chlorobenzotriazol-2-yl-4-methylphenol, 400 grams Silquest* PA-1 silicone-polyether copolymer, available from Momentive Performance Materials, Inc., 240 grams of [dodecanoyloxy(dioctyl)stannyl] dodecanoate, 12000 grams of polyethylene, available from Solvay under the trade name Eltex 4040P and 21080 grams of polyethylene, available from Solvay under the trade name Eltex 4040A. The contents of the bag were mixed by shaking the bag and then added to a MacQuire feeder attached to a Buss Kneader, model MKS 30-20 LID. The mixture was kneaded at 165° C. to 170° C., and then pelletized to yield a stabilizer masterbatch.

Example 2. Silane and Peroxide Composition

Into a mixing jar were placed 854.55 grams of vinyltrimethoxysilane, 45 grams of ditert-butyl peroxide, 0.45 grams of butylated hydroxytoluene, and 1,350 grams of a porous polyethylene. The contents were mixed and the liquid components adsorbed into the porous polyethylene to make a dry, flowable composition.

Example 3. Preparation of a PEX-b Pipe from a Crosslinkable Silane-Containing Polyolefin Composition of the Invention Into a MacQuire feeder was placed polyethylene resin, available from Solvay under the trade name Eltex 4040P, the stabilizer masterbatch of Example 1 and the silane and peroxide composition of Example 2. These components were fed into a single screw extruder, David Standard with a 30/1 L/D, equipped with a barrier screw with cooling and a pipe line. The ratio of the components were 90 weight percent Eltex 4040P, 5 weight percent stabilizer masterbatch from Example 1 and 5 weight percent of the silane and peroxide composition of Example 2. The temperature profile in the extruder ranged from 170° C. to 220° C. Pipe was produced by passing the material through a pipe die at the end of the extruder that formed a pipe with a ½-inch diameter. The pipe was cut into 15-inch lengths. The pipe was placed into a water batch at 95° C. for 16 hours to cure the polyolefin containing at least hydrolysable silyl group. Thus, the PEX-b pipe was made using a crosslinkable silane-containing polyolefin composition containing a polyolefin containing at least hydrolysable silyl group, a sterically hindered phenol antioxidant, a phosphite processing stabilizer, a sterically hindered amine light stabilizer, a substituted benzotriazol ultraviolet light absorber, silicone polyether copolymer, and a curing catalyst.

Example 4. Chlorine Resistance Testing of Pipe of Example 3

Six pipe specimens that were prepared in accordance with Example 3 were fitted with ASTM F1807 brass insert crimp fittings on both pipe ends. The specimens were exposed to continuous flowing chlorinated reverse osmosis water with a pH of 6.8, chlorine level of 4.4 mg/L, and flow rate of 0.38 L/minute. The specimens were tested at different pressures, temperatures and hoop stress. The testing conditions and time to failure are given in Table 1.

TABLE 1

Test conditions and results.

| Specimen | Temperature, ° C. | Pressure, bar | Hoop Stress, MPa | Test Time hours | Status |
|---|---|---|---|---|---|
| 4a | 115 | 4.14 | 1.44 | 1145 | Failure |
| 4b | 115 | 4.14 | 1.45 | 1360 | Failure |
| 4c | 115 | 2.76 | 0.97 | 1717 | Failure |
| 4d | 115 | 2.76 | 0.94 | 1670 | Failure |
| 4e | 105 | 5.52 | 1.95 | 3216 | Failure |
| 4f | 105 | 5.52 | 1.92 | 3913 | Failure |

Discoloration from a natural to a golden yellow color was observed for the failed specimens. On the inner surface, a thin layer of white degradation with minor to extensive micro-cracking and minor to moderate radial cracking was observed. The failures initiated on the inner pipe surface in the form of micro-cracks that propagated through the pipe wall to result in ultimate failure. Failure was due to a loss of fluid at a pinhole, weeping or brittle slit perforation. The failure generally appeared to be a chlorine-induced brittle oxidative failure.

The time-to-failure extrapolations were estimated using multiple linear-regression of the data from Table 1 and the Rate Process Model. The Rate Process Model is defined as:

$$\log(ft)=A+(b/T)+(C/T)(\log S)$$

where ft is failure time in hours, t is temperature in degree Kelvin, and S is the hoop stress in pounds per square in (psi), A is −17.6780, B is 8726 and C is −285.4. The extrapolated time-to-failure regression analysis for continuous hot water for ½" SDR 9 pipe specimens at 60° C. and 5.52 bar was 269 years and for intermittent hot water ½" SDR 9 pipe specimens at 25% service at 60° C. and 75% service at 23° C. and 5.52 bar was 1071 years, as defined by ASTM F2023. The extrapolated test lifetimes for Domestic Continuous Recirculation Service and the Traditional Domestic Service categories are 134 and 536 years, respectively.

Example 5. Illustrative Preparation of a Stabilizer Masterbatch

Eltex 4040P and Eltex 4040A, polyethylene resins from SOLVAY, are dried for 4 hours at 80° C. Into a plastic bag is added 3200 grams of 4-[[3,5-bis[(3,5-ditert-butyl-4-hydroxyphenyl)methyl]-2,4,6-trimethylphenyl]methyl]-2,6-ditert-butyl phenol, 480 grams octadecyl 3-(3,5-ditert-butyl-4-hydroxyphenyl)propanoate, 400 grams of tri(2,4-ditert-butylphenyl)phosphate, 200 grams 2-(2,3,8,10-tetratert-butylbenzo[d][1,3,2]benzodioxaphosphepin-6-yl)oxy-N,N-bis[2-(2,4,8,10-tetratert-butylbenzo[d][1,3,2]benzodioxaphosphepin-6-yl)oxyethyl]ethanamine, 800 grams of 3-(3,5-di-tert-butyl-4-hydroxyphenyl)-N-[3-(3,5-di-tert-butyl-4-hydroxyphenyl)propanoyl]propanohydrazide, 600 grams of butanedioic acid, dimethylester, polymer with 4-hydroxy-2,2,6,6-tetramethyl-1-piperidine ethanol, 600 grams of 2-tert-butyl-6-(5-chlorobenzotriazol-2-yl-4-methylphenol, 400 grams Silquest* PA-1 silicone-polyether copolymer, available from Momentive Performance Materials, Inc., 240 grams [dodecanoyloxy(dioctyl)stannyl]dodecanoate, 12000 grams of polyethylene, available from Solvay under the trade name Eltex 4040P and 21080 grams of polyethylene, available from Solvay under the trade name Eltex 4040A. The context of the bag are mixed by shaking the bag and then added to a MacQuire feeder attached to Werner & Heider, Model ZSK-30 twin-screw extruder. The mixture is extruded at maximum temperature of 235° C. to 240° C., and the pelletized to yield a stabilizer masterbatch. The processing temperature is sufficiently high to melt the high melting stabilizers, 3-(3,5-di-tert-butyl-4-hydroxyphenyl)-N'-[3-(3,5-di-tert-butyl-4-hydroxyphenyl)propanoyl] propanohydrazide and 4-[[3,5-bis[(3,5-ditert-butyl-4-hydroxyphenyl)methyl]-2,4,6-trimethylphenyl]methyl]-2,6-ditert-butyl phenol, which, when added to a polyolefin containing at least one hydrolysable silyl group, results in a pipe that does not contain a thin layer of white degradation.

Example 6. Illustrative Preparation of a Stabilizer Masterbatch

Eltex 4040A, a polyethylene from SOLVAY, is dried for 4 hours at 80° C. Into a plastic bag is added 800 grams of 3-(3,5-di-tert-butyl-4-hydroxyphenyl)-N'-[3-(3,5-di-tert-butyl-4-hydroxyphenyl)propanoyl]propanohydrazide and 3200 grams 4-[[3,5-bis[(3,5-ditert-butyl-4-hydroxyphenyl)methyl]-2,4,6-trimethylphenyl]methyl]-2,6-ditert-butyl phenol and 16,540 grams of Eltex 4040A and are mixed. Into a different bag is added 480 grams octadecyl 3-(3,5-ditert-butyl-4-hydroxyphenyl)propanoate, 400 grams of tri(2,4-ditert-butylphenyl)phosphate, 200 grams 2-(2,3,8,10-tetra-tert-butylbenzo[d][1,3,2]benzodioxaphosphepin-6-yl)oxy-N,N-bis[2-(2,4,8,10-tetratert-butylbenzo[d][1,3,2] benzodioxaphosphepin-6-yl)oxyethyl]ethanamine, 600 grams of butanedioic acid, dimethylester, polymer with 4-hydroxy-2,2,6,6-tetramethyl-1-piperidine ethanol, 600 grams of 2-tert-butyl-6-(5-chlorobenzotriazol-2-yl-4-methylphenol, 400 grams Silquest* PA-1 silicone-polyether copolymer, available from Momentive Performance Materials, Inc., 240 grams [dodecanoyloxy(dioctyl)stannyl]dodecanoate, 16,540 grams of polyethylene, available from Solvay under the trade name Eltex 4040A and are mixed. The first bag in emptied into a feeder at the front of the extruder and the second bag in emptied into a feeder at the middle of the extruder. The temperature of the first zone of Werner & Pfleider, Model ZSK-30 twin-screw extruder is 240° C. The middle zone of the extruder is 190° C. The contents of the first and second feeders are added to the extruder at the same rate. The dual addition of the stabilizers and other additives are done to minimize decomposition of the lower melting components. The extruder material is cooled in a room temperature water bath, palletized and then is dried at 100° C. for 2 hours.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, and it is intended that the invention embrace all such adaptations and modifications that fall within the spirit and broad scope of the appended claims. It is to be further understood that the phraseology or terminology herein is for the purpose of description and not of limitation, such that the terminology or phraseology of the present specification is to be interpreted by the skilled artisan in light of the teachings and guidance.

What is claimed is:

1. A crosslinkable silane-containing polyolefin composition comprising:
    (a) a polyolefin containing at least one hydrolysable silyl group prepared by grafting a silane containing a carbon-carbon double bond onto an already formed homopolymer of medium density polyethylene or high density polyethylene, or a polyolefin containing at least one hydrolysable silyl group prepared by copolymering the silane containing a carbon-carbon double bond with one comonomer to produce a medium density polyethylene or high density polyethylene containing at least one hydrolysable group, wherein the silane containing a carbon-carbon double bond is selected from the group consisting of 2,4-dimethyl-2-vinyl-[1,3,2]dioxasilinane, 2-methoxy-4-methyl-2-vinyl-[1,3,2]dioxasilinane, 2-methoxy-4,4,6-trimethyl-2-vinyl-[1,3,2]dioxasilinane, 2,4,4,6-tetramethyl-2-vinyl-[1,3,2]dioxasilinane, 2,5-dimethyl-2-vinyl-[1,3,2]dioxasilinane, 2-methoxy-5-methyl-2-vinyl-[1,3,2]dioxasilinane, acrylic acid 3-(2,4,4,6-tetramethyl-[1,3,2]dioxasilinan-2-yl)-propyl ester, acrylic acid 3-(2,5-dimethyl-[1,3,2]dioxasilinan-2-yl)-propyl ester, acrylic acid 3-(2,4-dimethyl-[1,3,2]dioxasilinan-2-yl)-propyl ester, acrylic acid 3-(2-methoxy-4,4,6-trimethyl-[1,3,2]dioxasilinan-2-yl)-propyl ester, acrylic acid 3-(2-methoxy-5-methyl-[1,3,2]dioxasilinan-2-yl)-propyl ester, acrylic acid 3-(2-methoxy-4-methyl-[1,3,2]dioxasilinan-2-yl)-propyl ester, 2-methyl-acrylic acid 3-(2,4,4,6-tetramethyl-[1,3,2]dioxasilinan-2-yl)-propyl ester, 2-methyl-acrylic acid 3-(2,5-dimethyl-[1,3,2]dioxasilinan-2-yl)-propyl ester, 2-methyl-acrylic acid 3-(2,4-dimethyl-[1,3,2]dioxasilinan-2-yl)-propyl ester, 2-methyl-acrylic acid 3-(2-methoxy-4,4,6-trimethyl-[1,3,2]dioxasilinan-2-yl)-propyl ester, 2-methyl-acrylic acid 3-(2-methoxy-5-methyl-[1,3,2]dioxasilinan-2-yl)-propyl ester, 2-methyl-acrylic acid 3-(2-methoxy-4-methyl-[1,3,2]dioxasilinan-2-yl)-propyl ester, and mixtures thereof;
    (b) a mixture containing a sterically hindered phenol antioxidant containing a single phenolic group having the structure octadecyl 3-(3,5-di-tertiary-butyl-4-hydroxyphenyl)propanoate and a sterically hindered phenol antioxidant containing multiple phenolic groups having the structure 4-[[3,5-bis[(3,5-di-tertiary-butyl-4-hydroxyphenyl)methyl]-2,4,6-trimethylphenyl]methyl]-2,6-di-tertiary-butyl phenol;
    (c) a phosphite processing stabilizer;
    (d) a sterically hindered amine light stabilizer;
    (e) a substituted benzotriazol ultraviolet light absorber; and
    (f) a curing catalyst.

2. The crosslinkable silane-containing polyolefin composition of claim 1 further comprising a metal deactivator of the general Formula (XII):

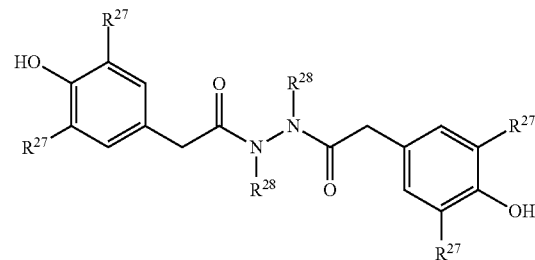

wherein:
    each occurrence of $R^{27}$ is independently a monovalent alkyl, aryl or aralkyl group containing from 1 to 16 carbon atoms; and
    each occurrence of $R^{28}$ is independently a hydrogen atom or a monovalent alkyl, aryl or aralkyl group containing from 1 to 16 carbon atoms.

3. The crosslinkable silane-containing polyolefin composition of claim 2 wherein the metal deactivator is selected from the group consisting of 1,2-bis(3,5-di-tert-butyl-4-hydroxyhydrocinnamoyl)hydrazine, 2,2'-oxamidobis(ethyl-3-(3,5-di-tert-4-hydroxyphenyl)-propionate, tris[2-tert-butyl-4-(5-tert-butyl-4-hydroxy-2-methylphenyl)sulfanyl-5-methylphenyl]phosphate, 2-[[2-[2-[3-(3,5-ditert-butyl-4-hydroxyphenyl)propanoyloxy]ethylamino]-2-oxoacetyl]amino]ethyl 3-(3,5-ditert-butyl-4-hydroxyphenyl)propanoate, and mixtures thereof.

4. The crosslinkable silane-containing polyolefin composition of claim 1, wherein the composition comprises:
    90 to 99.95 weight percent of the polyolefin containing at least one hydrolysable silyl group (a);

0.01 to 4 weight percent of the mixture containing the sterically hindered phenol antioxidant containing a single phenolic group and the sterically hindered phenol antioxidant containing multiple phenolic groups (b);

0.01 to 2 weight percent of the phosphite processing stabilizer (c);

0.01 to 2 weight percent of the sterically hindered amine light stabilizer (d);

0.01 to 2 weight percent of the substituted benzotriazol ultraviolet light absorber (e); and 0.01 to 2 weight percent of the curing catalyst (f);

wherein said weight percents are based upon the total weight of components (a) through (f).

5. The crosslinkable silane-containing polyolefin composition of claim 1, comprising:

95 to 99.1 weight percent of the polyolefin containing at least one hydrolysable silyl group (a);

0.3 to 1 weight percent of the mixture containing the sterically hindered phenol antioxidant containing a single phenolic group and the sterically hindered phenol antioxidant containing multiple phenolic groups (b);

0.05 to 0.15 weight percent of the phosphite processing stabilizer (c);

0.05 to 0.15 weight percent of the sterically hindered amine light stabilizer (d);

0.05 to 0.5 weight percent of the substituted benzotriazol ultraviolet light absorber (e); and 0.02 to 1.5 weight percent of the curing catalyst (f);

wherein said weight percents are based upon the total weight of components (a) through (f).

6. The crosslinkable silane-containing polyolefin composition of claim 1 wherein the silane containing a carbon-carbon double bond is selected from the group consisting of 2,4-dimethyl-2-vinyl-[1,3,2]dioxasilinane, 2-methoxy-4-methyl-2-vinyl-[1,3,2]dioxasilinane, 2-methoxy-4,4,6-trimethyl-2-vinyl-[1,3,2]dioxasilinane, 2,4,4,6-tetramethyl-2-vinyl-[1,3,2]dioxasilinane, 2,5-dimethyl-2-vinyl-[1,3,2]dioxasilinane, 2-methoxy-5-methyl-2-vinyl-[1,3,2]dioxasilinane, and mixtures thereof.

7. The crosslinkable silane-containing polyolefin composition of claim 1 wherein the phosphite processing stabilizer (c) is of the general Formula (VI):

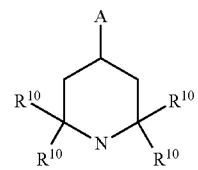

(VI)

wherein:

$R^7$ is selected from the group consisting of a monovalent hydrocarbon containing from 1 to 25 carbon atoms, a monovalent hydrocarbon containing from 1 to 25 carbon atoms and at least one heteroatom selected from the group consisting of oxygen, nitrogen and sulfur, and a polyvalent hydrocarbon containing from 1 to 25 carbon atoms in which at least one carbon atom is bonded to the oxygen of the oxygen-phosphorus group and at least one carbon atom is covalently bonded to a carbon atom of the $R^8$ group;

$R^8$ is selected from the group consisting of a monovalent hydrocarbon containing from 1 to 25 carbon atoms, a monovalent hydrocarbon containing from 1 to 25 carbon atoms and at least one heteroatom selected from the group consisting of oxygen, nitrogen and sulfur, and a polyvalent hydrocarbon containing from 1 to 25 carbon atoms in which at least one carbon atom is bonded to the oxygen of the oxygen-phosphorus group and at least one carbon atom is covalently bonded to a carbon atom of the $R^7$ group; and $R^9$ is a monovalent hydrocarbon containing 1 to 25 carbon atoms and optionally contains at least one heteroatom selected from the group consisting of oxygen, nitrogen and sulfur.

8. The crosslinkable silane-containing polyolefin composition of claim 7 wherein the phosphite processing stabilizer (c) is selected from the group consisting of tris(2,4-di-tert-butylphenyl)phosphite; 2-(2,4,8,10-tetratert-butylbenzo[d][1,3,2]benzodioxaphosphepin-6-yl)oxy-N,N-bis[2-(2,4,8,10-tetratert-butylbenzo[d][1,3,2]benzodioxaphosphepin-6-yl)oxyethyl]ethanamine; bis(2,4-di-tert-butyl-6-methylphenyl)-ethyl-phosphite; 3,9-bis-(2,4-di-tert-butylphenoxy)-2,4,8,10-tetraoxa-3,9-diphospha-spiro[5.5]undecane; and mixtures thereof.

9. The crosslinkable silane-containing polyolefin composition of claim 1 wherein the sterically hindered amine light stabilizer (d) is an organic compound containing at least one occurrence of the structural unit of the general Formula (VII):

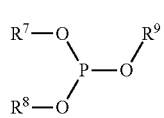

(VII)

wherein:

A is a nitrogen atom, a carbon atom, or an oxygen atom, with the proviso that the open valences of the atoms A and nitrogen are filled with a hydrogen, an organic group, or a lone pair of electrons, and each occurrence of $R^{10}$ is independently an alkyl group of from 1 to 6 carbon atoms.

10. The crosslinkable silane-containing polyolefin composition of claim 1 wherein the sterically hindered amine light stabilizer (d) is a monomeric, oligomeric or polymeric molecule of the general Formula (VIII) or (IX):

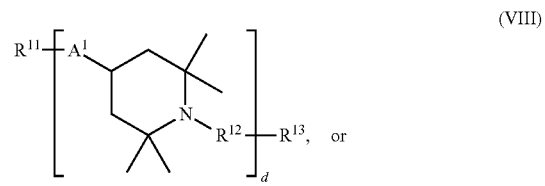

(VIII)

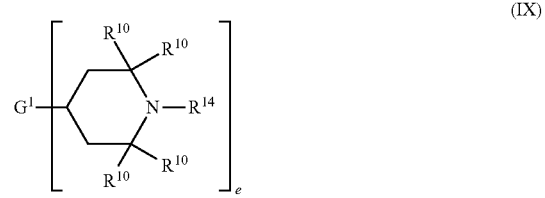

(IX)

wherein:

each occurrence of $A^1$ is independently selected from the group consisting of alkenylene of 1 to 10 carbon atoms, an oxygen atom, and $NR^{11}$;

each occurrence of $R^{10}$ is independently an alkyl group of from 1 to 6 carbon atoms;

$R^{11}$ is selected from the group consisting of hydrogen, a monovalent hydrocarbon group of 1 to 10 carbon atoms, an amino group —$NR^{10}{}_2$ wherein $R^{10}$ is an alkyl group of from 1 to 6 carbon atoms, a hydroxyl group, and a mercaptan group;

each occurrence of $R^{12}$ is independently a divalent alkylene, alkenylene, arylene or aralkylene group of 1 to 20 carbon atoms or a divalent organic group of 1 to 20 carbon atoms containing at least one ether, ester, ketone, amide, amine, thioether, or thioester group;

$R^{13}$ is selected from the group consisting of hydrogen, a monovalent hydrocarbon group of 1 to 10 carbon atoms, an amino group —$NR^{10}{}_2$ wherein $R^{10}$ is an alkyl group of from 1 to 6 carbon atoms, a hydroxyl group, and a mercaptan group; and $R^{14}$ is independently selected from the group consisting of hydrogen or monovalent alkyl, alkenyl, aryl, or aralkyl of from 1 to 10 carbon atoms;

$G^1$ is an organic group of 1 to 1000 carbon atoms and optionally contains at least one triazine, pyrimidine, pyridine, [1,3,5]triazinane-2,4,6-trione, [1,3,5]triazine-2,4,6-triamine ether, ester, ketone, amide, amine, thioether, or thioester group; and the subscripts d and e are integers where d is from 1 to 100 and e from 1 to 100.

11. The crosslinkable silane-containing polyolefin composition of claim 10 wherein the sterically hindered amine light stabilizer (d) is selected from the group consisting of 3-(2,2,6,6-tetramethyl-piperidin-4-yloxy)-propionic acid, 4-(2,2,6,6-tetramethyl-piperidin-4-yl)-butyric acid, poly-[4-(2,2,6,6-tetramethyl-piperidin-4-yl)-butyric acid]ester, poly[[6-[(1,1,3,3-tetramethybutyl)amino]-1,3,5-triazine-2,4-diyl][(2,2,6,6-tetramethyl-4-piperidinyl)imino]-1,6-hexanediyl[(2,2,6,6-tetramethyl-4-piperidiny)imino]], bis(2,2,6,6-tetramethyl-4-piperidyl)-maleate, bis(2,2,6,6-tetraethyl-4-piperidyl)maleate, bis(2,2,6,6-tetrahexyl-4-piperidyl)sebaceate, bis(1,2,2,6,6-pentamethyl-4-piperidinyl)-2-butyl-2-(4-hydroxy-3,5-di-tert-butylbenzyl)-propanedioate, poly-[7-(4-hydroxy-2,2,6,6-tetramethyl-piperidin-1-yl)-4-oxo-heptanoic acid]ester, poly-[6-(4-hydroxy-2,2,6,6-tetraethyl-piperidin-1-yl)-hexanoic acid] ester, poly-[7-(4-hydroxy-2,2,6,6-tetramethyl-piperidin-1-yl)-4-oxo-heptanoic acid]ester, 7-(4-hydroxy-2,2,6,6-tetramethyl-piperidin-1-yl)-4-oxo-heptanoic acid 1-tert-butyl-2,2,6,6-tetramethyl-piperidin-4-yl ester, 7-(4-hydroxy-2,2,6,6-tetramethyl-piperidin-1-yl)-4-oxo-heptanoic acid, 8-(4-hydroxy-2,2,6,6-tetramethyl-piperidin-1-yl)-5-oxo-octanoic acid, 6-(4-hydroxy-2,2,6,6-tetramethyl-piperidin-1-yl)-hexanoic acid, 4-(4-hydroxy-2,2,6,6-tetramethyl-piperidin-1-yl)-benzoic acid, polymer resulting from the reaction of dimethylbutanedioate with 4-hydroxy-2,2,6,6-tetramethyl-1-piperidine ethanol, and mixtures thereof.

12. The crosslinkable silane-containing polyolefin composition of claim 1 wherein the substituted benzotriazol ultraviolet light absorber (e) is of the general Formula (X):

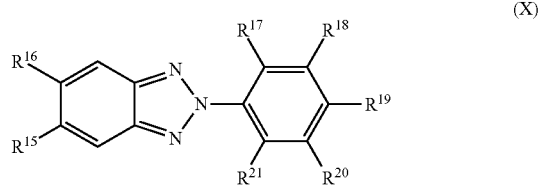

wherein:
$R^{15}$ is a hydrogen atom or fluoride, chloride, iodide, nitrile, hydroxyl, carboxyl, or alkyl group of from 1 to 10 carbon atoms;

$R^{16}$ is a hydrogen atom or fluoride, chloride, iodide, nitrile, hydroxyl, carboxyl, or alkyl group of from 1 to 10 carbon atoms;

$R^{17}$ is a hydrogen atom or hydroxyl, alkoxy, carboxyl, nitrile, chloride, or alkyl group of from 1 to 10 carbon atoms;

$R^{18}$ is a hydrogen atom or a monovalent alkyl group containing from 1 to 10 carbon atoms;

$R^{19}$ is a hydrogen atom or hydroxyl, alkoxyl, carboxyl, nitrile, chloride, or alkyl group of from 1 to 10 carbon atoms;

$R^{20}$ is a hydrogen atom or a monovalent alkyl group containing from 1 to 100 carbon atoms and optionally contains at least one ether, ester, hydroxyl, amino, or carboxyl group; and $R^{21}$ is a hydrogen atom or hydroxyl, carboxyl, nitrile, chloride, or alkyl group of from 1 to 10 carbon atoms; and with the proviso that at least one of $R^{17}$ or $R^{19}$ is a hydroxyl group.

13. The crosslinkable silane-containing polyolefin composition of claim 12 wherein the substituted benzotriazol ultraviolet light absorber (e) is selected from the group consisting of 2-benzotriazol-2-yl-6-tert-butyl-4-methyl-phenol, 3-(3-benzotriazol-2-yl-5-tert-butyl-4-hydroxy-phenyl)-propionic acid 2-(2-hydroxy-ethoxy)-ethyl ester, 3-(3-benzotriazol-2-yl-5-tert-butyl-4-hydroxy-phenyl)-propionic acid 2-[2-(2-hydroxy-ethoxy)-ethoxy]-ethyl ester, 3-(3-benzotriazol-2-yl-5-tert-butyl-4-hydroxy-phenyl)-propionic acid 2-{2-[2-(2-hydroxy-ethoxy)-ethoxy]-ethoxy}-ethyl ester, 3-(3-benzotriazol-2-yl-5-tert-butyl-4-hydroxy-phenyl)-propionic acid, 4-benzotriazol-2-yl-2-tert-butyl-6-methyl-phenol, 4-benzotriazol-2-yl-2,6-di-tert-butyl-phenol, 2-tert-butyl-4-methyl-6-(5-methyl-benzotriazol-2-yl)-phenol, 2-(3-tert-butyl-2-hydroxy-5-methyl-phenyl)-2H-benzotriazole-5-carbonitrile, 2-tert-butyl-6-(5-chloro-benzotriazol-2-yl)-4-methyl-phenol, 2-(5-chloro-benzotriazol-2-yl)-4,6-bis-(1-methyl-1-phenyl-ethyl)-phenol, 2-benzotriazol-2-yl-4,6-bis-(1-methyl-1-phenyl-ethyl)-phenol, and mixtures thereof.

14. The crosslinkable silane-containing polyolefin composition of claim 1 wherein the curing catalyst (f) is selected from the group consisting of mineral acid, organic acid, Lewis acid, group 1A or 1B salts of hydroxide, amines, metal alkoxides, metal oxides, metal carboxylates including tin carboxylates and cobalt carboxylates, metal chelated with organic ligands, and mixtures thereof.

15. The crosslinkable silane-containing polyolefin composition of claim 14 wherein the curing catalyst (f) is selected from the group consisting of dibutyltin diacetate, dibutyl tin dilaurate, dioctyltin dilaurate, dibutyltin dioleate, stannous acetate, cobalt naphthenate, zinc caprylate, iron 2-ethylhexanoate, tetra-butyl titanate, tetra-ethyl titanate, tetra-nonyl titanate, and mixtures thereof.

16. A process for making the crosslinkable silane-containing polyolefin composition of claim 1 comprising mixing the polyolefin containing at least one hydrolysable silyl group (a) with a stabilizer masterbatch comprising:
(a1) a polyolefin,
(b) a mixture containing a sterically hindered phenol antioxidant containing a single phenolic group of the general Formula (IV):

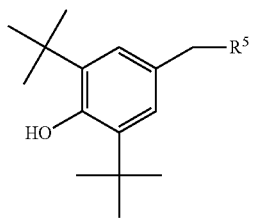

(IV)

wherein R⁵ is a monovalent or polyvalent organic radical of from 1 to 50 carbon atoms and optionally containing substituents selected from group consisting of hydroxyl group, amide group, an ester group, isocyanurate group, ether group, amine group, hydrazide group and sulfide group, and
a sterically hindered phenolic antioxidant containing multiple phenolic groups of the general Formula (V):

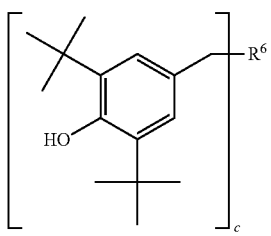

(V)

wherein R⁶ is a divalent, trivalent or tetravalent organic group of from 1 to 50 carbon atoms and optionally containing substituents selected from group consisting of hydroxyl group, amide group, ester group, isocyanurate group, ether group, amine group, hydrazide group and sulfide group, and the subscript c is an integer of from 2 to 4;
(c) a phosphite processing stabilizer of the general Formula (VI):

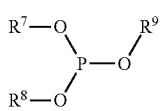

(VI)

wherein R⁷ is selected from the group consisting of a monovalent hydrocarbon containing from 1 to 25 carbon atoms, a monovalent hydrocarbon containing from 1 to 25 carbon atoms and at least one heteroatom selected from the group consisting of oxygen, nitrogen and sulfur, and a polyvalent hydrocarbon containing from 1 to 25 carbon atoms in which at least one carbon atom is bonded to the oxygen of the oxygen-phosphorus group and at least one carbon atom is covalently bonded to a carbon atom of the R⁸ group; R⁸ is selected from the group consisting of a monovalent hydrocarbon containing from 1 to 25 carbon atoms, a monovalent hydrocarbon containing from 1 to 25 carbon atoms and at least one heteroatom selected from the group consisting of oxygen, nitrogen and sulfur, and a polyvalent hydrocarbon containing from 1 to 25 carbon atoms in which at least one carbon atom is bonded to the oxygen of the oxygen-phosphorus group and at least one carbon atom is covalently bonded to a carbon atom of the R⁷ group; and R⁹ is a monovalent hydrocarbon containing 1 to 25 carbon atoms and optionally contains at least one heteroatom selected from the group consisting of oxygen, nitrogen and sulfur;
(d) a sterically hindered amine light stabilizer of the general Formula (VIII) or (IX):

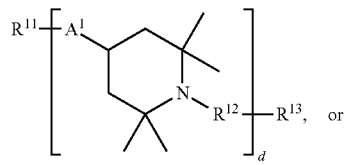

(VIII)

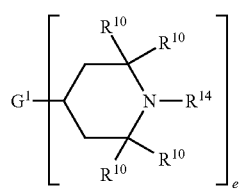

(IX)

wherein each occurrence of A¹ is independently selected from the group consisting of alkenylene of 1 to 10 carbon atoms, an oxygen atom, and NR¹¹; each occurrence of R¹⁰ is independently an alkyl group of from 1 to 6 carbon atoms; R¹¹ is selected from the group consisting of hydrogen, a monovalent hydrocarbon group of 1 to 10 carbon atoms, an amino group —NR¹⁰₂ wherein R¹⁰ is an alkyl group of from 1 to 6 carbon atoms, a hydroxyl group, and a mercaptan group; each occurrence of R¹² is independently a divalent alkylene, alkenylene, arylene or aralkylene group of 1 to 20 carbon atoms or a divalent organic group of 1 to 20 carbon atoms containing at least one ether, ester, ketone, amide, amine, thioether or thioester group; R¹³ is selected from the group consisting of hydrogen, a monovalent hydrocarbon group of 1 to 10 carbon atoms, an amino group —NR¹⁰₂ wherein R¹⁰ is an alkyl group of from 1 to 6 carbon atoms, a hydroxyl group, and a mercaptan group; R¹⁴ is independently selected from the group consisting of hydrogen or monovalent alkyl, alkenyl, aryl, or aralkyl of from 1 to 10 carbon atoms; G¹ is an organic group of 1 to 1000 carbon atoms and optionally contains at least one triazine, pyrimidine, pyridine, [1,3,5]triazinane-2,4,6-trione, [1,3,5]triazine-2,4,6-triamine ether, ester, ketone, amide, amine, thioether, or thioester group; and the subscripts d and e are integers where d is from 1 to 100 and e from 1 to 100;
(e) a substituted benzotriazol ultraviolet light absorber of the general Formula (X):

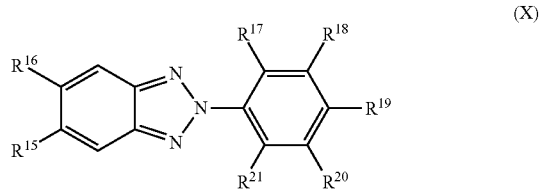

(X)

wherein $R^{15}$ is a hydrogen atom or fluoride, chloride, iodide, nitrile, hydroxyl, carboxyl, or alkyl group of from 1 to 10 carbon atoms; $R^{16}$ is a hydrogen atom or fluoride, chloride, iodide, nitrile, hydroxyl, carboxyl, or alkyl group of from 1 to 10 carbon atoms; $R^{17}$ is a hydrogen atom or hydroxyl, alkoxy, carboxyl, nitrile, chloride, or alkyl group of from 1 to 10 carbon atoms; $R^{18}$ is a hydrogen atom or a monovalent alkyl group containing from 1 to 10 carbon atoms; $R^{19}$ is a hydrogen atom or hydroxyl, alkoxyl, carboxyl, nitrile, chloride, or alkyl group of from 1 to 10 carbon atoms; $R^{20}$ is a hydrogen atom or a monovalent alkyl group containing from 1 to 100 carbon atoms and optionally contains at least one ether, ester, hydroxyl, amino, or carboxyl group; and $R^{21}$ is a hydrogen atom or hydroxyl, carboxyl, nitrile, chloride, or alkyl group of from 1 to 10 carbon atoms; and with the proviso that at least one of $R^{17}$ or $R^{19}$ is a hydroxyl group;

(f) a curing catalyst selected from the group consisting of mineral acid, organic acid, Lewis acid, group 1A or 1B salts of hydroxide, amines, metal alkoxides, metal oxides, metal carboxylates including tin carboxylates and cobalt carboxylates, metal chelated with organic ligands, and mixtures thereof; and (g) optionally, a metal deactivator of the general Formula (XII):

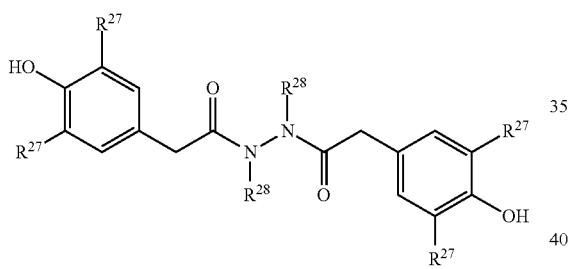

(XII)

wherein each occurrence of $R^{27}$ is independently a monovalent alkyl, aryl or aralkyl group containing from 1 to 16 carbon atoms; and each occurrence of $R^{28}$ is independently a hydrogen atom or a monovalent alkyl, aryl or aralkyl group containing from 1 to 16 carbon atoms, wherein said stabilizer masterbatch is made by a process comprising the steps:

(i) adding to polyolefin (a1) additives of (b), (c), (d), and (e) having a melting point above 190° C., (ii) mixing the contents of (i) at a temperature of from 200° C. to 300° C. to melt and dissolve said additives into the polyolefin, (iii) cooling the polyolefin composition of (ii) to a temperature of 120° C. to 200° C., said temperature being lower than that of step (ii), (iv) adding to the contents of step (iii), at a lower temperature than that of step (iii), the remainder of additives (b), (c), (d), and (e) having a melting temperature at or below 190° C., (v) mixing the contents of (iv), and (vi) cooling the contents of (v) to room temperature.

17. An article made from a cured composition of the crosslinkable silane-containing polyolefin composition of claim 1.

18. The article of claim 17 wherein the article is selected from the group consisting of potable water pipes, radiant floor heating pipes, central and district heating pipes and ducts, air conditioning pipes and ducts, pipes for transporting gases, compressed air, fluids, valves, bottles, fittings, joints, cylinders, and tanks.

19. A process for making the crosslinkable silane-containing polyolefin composition of claim 1, prepared from a stabilized masterbatch comprising:

(a) a polyethylene;

(b) a mixture containing a sterically hindered phenol antioxidant containing a single phenolic group antioxidant and a sterically hindered phenol antioxidant containing multiple phenolic groups, wherein the mixture containing the sterically hindered phenol antioxidant containing a single phenolic group and the sterically hindered phenolic antioxidant containing multiple phenolic groups (b) is 4-[[3,5-bis[(3,5-ditert-butyl-4-hydroxyphenyl)methyl]-2,4,6-trimethylphenyl]methyl]-2,6-ditert-butylphenol and octadecyl 3-(3,5-ditert-butyl-4-hydroxyphenyl) propanoate;

(c) a phosphite processing stabilizer having the structure tris-(2,4-di-tertiary butylphenyl) phophite;

(d) a sterically hindered amine light stabilizer which is a polymer resulting from the reaction of dimethylbutanedioate with 4-hydroxy-2,2,6,6-tetramethyl-1-piperidine ethanol;

(e) a substituted benzotriazol ultraviolet light absorber having the structure 2-tertiary-butyl-6-(5-chlorobenzotriazol-2-yl-4-methylphenol;

(f) a curing catalyst; and, optionally, a metal deactivator.

20. The crosslinkable silane-containing polyolefin composition of claim 1 wherein the silane containing a carbon-carbon double bond is 2-methoxy-4-methyl-2-vinyl-[1,3,2] dioxasilinane.

* * * * *